United States Patent
Denoual et al.

(10) Patent No.: US 12,088,860 B2
(45) Date of Patent: Sep. 10, 2024

(54) METHOD, DEVICE, AND COMPUTER PROGRAM FOR IMPROVING RANDOM PICTURE ACCESS IN VIDEO STREAMING

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Val D'Anast (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/917,168

(22) PCT Filed: Apr. 6, 2021

(86) PCT No.: PCT/EP2021/058977
§ 371 (c)(1),
(2) Date: Oct. 5, 2022

(87) PCT Pub. No.: WO2021/204827
PCT Pub. Date: Oct. 14, 2021

(65) Prior Publication Data
US 2023/0164371 A1    May 25, 2023

(30) Foreign Application Priority Data

Apr. 6, 2020 (GB) .................... 2005075
Jun. 16, 2020 (GB) .................... 2009169

(51) Int. Cl.
*H04N 21/2343* (2011.01)
*H04N 19/169* (2014.01)

(52) U.S. Cl.
CPC ....... *H04N 21/2343* (2013.01); *H04N 19/188* (2014.11)

(58) Field of Classification Search
CPC .................... H04N 21/2343; H04N 19/188
See application file for complete search history.

(56) References Cited

U.S. PATENT DOCUMENTS

| 9,648,348 B2 | 5/2017 | Wang |
| 11,631,158 B2 * | 4/2023 | Lee .................... G06T 9/001 |
| | | 382/100 |

(Continued)

FOREIGN PATENT DOCUMENTS

| GB | 2522014 A | 7/2015 |
| WO | 2017/065966 A1 | 4/2017 |

OTHER PUBLICATIONS

Ouedraogo, Naël, et al., AHG9: On prefix and suffix APS, Joint Video Experts Team (JVET) of ITU-T SG 16 WP 3 and ISO/IEC JTC 1/SC 29/WG11, 18th Meeting: by teleconference, Apr. 15-24, 2020, Doc. No. JVET-R0201.

(Continued)

*Primary Examiner* — Nnenna N Ekpo
(74) *Attorney, Agent, or Firm* — Canon U.S.A., Inc. IP Division

(57) ABSTRACT

A method for encapsulating a video bit-stream in a server, including obtaining at least one network abstraction layer unit (NAL unit) of a first picture, buffering the at least one obtained NAL unit, obtaining at least one NAL unit of a second picture, the second picture being a random access picture following the first picture, and encapsulating the at least one obtained NAL unit of the second picture and the at least one buffered NAL unit in an encapsulation structure making it possible to generate a video bit-stream without processing the encapsulated at least one buffered NAL unit when processing the encapsulated video bit-stream.

19 Claims, 13 Drawing Sheets

(56) References Cited

U.S. PATENT DOCUMENTS

| | | |
|---|---|---|
| 2014/0098860 A1 | 4/2014 | Wang |
| 2015/0110192 A1 | 4/2015 | Wang et al. |
| 2017/0111649 A1 | 4/2017 | Wang et al. |
| 2017/0347166 A1 | 11/2017 | Wang |
| 2021/0105313 A1* | 4/2021 | Wang ..................... H04L 65/70 |

OTHER PUBLICATIONS

Information technology—Coding of audio-visual objects—Part 15: Carriage of network abstraction layer (NAL) unit structured video in the ISO base media file format, ISO/IEC JTC 1/SC 29/WG 11, Jan. 13, 2014.

* cited by examiner

METHOD, DEVICE, AND COMPUTER PROGRAM FOR IMPROVING RANDOM PICTURE ACCESS IN VIDEO STREAMING

CROSS REFERENCE TO RELATED APPLICATION

This application is the National Phase application of PCT Application No. PCT/EP2021/058977, filed on Apr. 6, 2021. This application claims the benefit under 35 U.S.C. § 119(a)-(d) of United Kingdom Patent Application No. 2005075.3, filed on Apr. 6, 2020 and United Kingdom Patent Application No. 2009169.0, filed on Jun. 16, 2020. The above cited patent applications are incorporated herein by reference in their entirety.

FIELD OF THE INVENTION

The present invention relates to a method, a device, and a computer program for improving random picture access in video streams, for example for improving random access in a media file carrying versatile video codec (VVC) bit-streams.

BACKGROUND OF THE INVENTION

The joint video exploration team (JVET) group is standardizing a video codec called versatile video codec (VVC) offering better compression performance than previous codecs, in particular the codecs known as HEVC (high efficiency video coding) and AVC (advanced video coding). This compression gain is obtained thanks to new compression or filtering tools. One of these tools is the adaptive loop filter minimizing the mean square error between original pixels and decoded pixels using adaptive filter coefficients.

The VVC has a block-based hybrid coding architecture, combining inter-picture and intra-picture prediction and transform coding with entropy coding. In broad outline, the data to be transmitted are coded according to VCL (video coding layer) NAL units and according to non-VCL NAL units, wherein a network abstraction layer unit (NAL unit or NALU) is a syntax structure containing data and an indication of the type of these data. For example, the non-VCL NALUs may consist in parameter sets or adaptation parameter set NAL units while VCL NALUs may be coded slice NAL units. Some non-VCL NALUs may also consist in SEI messages (Supplemental Enhancement Information) that may assist processes related to decoding, display or other purposes.

FIG. 1a illustrates an example of a sequence of picture units (PU) complying with VVC. For the sake of illustration, the sequence comprises four picture units denoted 100-1 to 100-4, the first and the third picture units being selectable by a user as an entry picture (or random access point) within the sequence. Such entry picture units are referred to as intra random access pictures (IRAP). This means that, for example, the decoding process may start from picture 100-3, as illustrated with bold arrow 105.

For the sake of illustration, picture unit 100-1 contains both non-VCL NAL units, for example non-VCL NAL unit 110, and VCL NAL units, for example VCL NAL units 115-1 to 115-3.

As illustrated, a picture unit, for example picture unit 100-2, may contain only VCL NAL units and may reference non-VCL NAL units from previous picture units, as illustrated by the dashed arrows. For example, a VCL NAL unit may reference adaptation parameter set NAL unit(s) (APS NAL unit(s)), through one or more syntax elements declared in the slice header.

However, as illustrated with the dashed bold arrows, corresponding to a reference to non-VCL NAL unit 110 from random access picture 100-3 and from a subsequent picture 100-4, a problem may arise when non-VCL NAL units of a previous picture unit are referenced by a random access picture to be used as a starting picture of a sequence of pictures and/or by a following picture unit. According to the illustrated example, VCL NAL unit 120 of picture unit 100-3 and VCL NAL unit 125 of picture unit 100-4 depend on non-VCL NAL unit 110 of picture unit 100-1. Therefore, non-VCL NAL unit 110 must be available to decode VCL NAL units 120 and 125.

Accordingly, when at least one VCL NAL unit in a random access picture or in a picture between two random access pictures depends on one or more non-VCL NAL units from a picture unit preceding the random access picture, the storage in a file format must handle these dependencies so as to encapsulate random access samples as real random access samples (i.e. not requiring any data or NAL units from previous samples).

It is noted that dependencies between VCL NAL units and non-VCL NAL units from the preceding random access picture unit or from picture units between the preceding random access and the pictures units comprising the VCL units is not an issue. As illustrated, the dependency from VCL NAL unit 130 to APS NAL unit 135 is not an issue because the decoding cannot be started from picture 100-4 but only from IRAP picture 100-1 (first picture of the bit-stream) or from IRAP picture 100-3.

While ISOBMFF and its extension for NALU-based video codec (ISO/IEC 14496-15) historically provide a support for random access in compressed video bit-streams, the problem stated above from the VVC specification introduces new constraints for random access samples.

As a matter of fact, when a picture was indicated as a random access point in a bit-stream conforming to a previous codec like HEVC or AVC, this meant that no NAL unit from previous pictures were required for the decoding. This is no longer the case within VVC bit-streams because some picture units, signalled as intra random access point pictures (IRAP pictures) may have dependencies on non-VCL NAL units from previous picture units in the bit-stream, for example dependencies on APS NAL units (as illustrated in FIG. 1a).

FIG. 1b illustrates an example of description of random or synchronization samples in the ISO Base media file format, for the video track referenced 150. Typically, these samples are described using the 'sync' (or a 'rap') sample group mechanism, for example 'sync' sample group 155, or a dedicated box in the sample description, for example the SyncSampleBox (not illustrated). For the sake of illustration, samples 160-1 and 160-2 are described in 'sync' sample group 155 as synchronization or random access samples. They may also be described in a SyncSampleBox in the SampleTableBox providing sample description.

It is noted that while such mechanisms indicate samples onto which a decoder can start decoding, they do not provide the necessary decoding context (non-VCL NALUs) required for the decoder to correctly reconstruct the pictures from the compressed bit-stream.

The non-VCL NALUs required for random access may be transmitted out-of-band (i.e. they can be handled by the transport layer). However, it may be preferable to encapsulate a self-contained track, i.e. having these required NALUs for random access be transmitted with the description of the track (e.g. 'trak' or 'traf' box) or within the data of the track (e.g. 'mdat' or 'imda' box), especially for streaming applications where one wants to limit the number of requests on the network to start playout or seek within a media file.

Consequently, there is a need to improve the mechanisms making it possible to access a random picture in an encapsulated video stream.

The present invention has been devised to address one or more of the foregoing concerns.

SUMMARY OF THE INVENTION

According to a first aspect of the invention, there is provided a method for encapsulating a video bit-stream in an ISOBMFF track comprising samples, in a computing device, the method comprising:
- generating a specific data structure comprising a specific SampleToGroupBox and an associated SampleGroupDescriptionBox for identifying network abstraction layer units (NAL units) of first samples, the identified NAL units being referenced by NAL units of a second sample, the second sample being a random access sample following the first samples, the second sample in the video bit-stream requiring at least some of the NAL units of the first samples to be decoded and
- encapsulating the generated specific data structure, NAL units of the first samples, and NAL units of the second sample.

Accordingly, the method of the invention makes it possible to improve video streaming by enabling access to random pictures in video streams while improving the use of the resources of a decoder and the transmission bandwidth.

According to a particular embodiment, the NAL units of the first samples comprise non video coding layer (VCL) NAL units and the SampleGroupDescriptionBox contains entries to reference the first samples, the entries providing a pre-processing instruction to a parser for gathering the identified NAL units in the second sample.

According to a second aspect of the invention, there is provided a method for generating a video bit-stream from an ISOBMFF track comprising samples, in a computing device, the method comprising:
- receiving an instruction for generating a video bit-stream starting from a selected random access sample,
- obtaining at least one network abstraction layer unit (NAL unit) of the selected random access sample,
- obtaining a specific data structure, the obtained specific data structure comprising a specific SampleToGroupBox and an associated SampleGroupDescriptionBox for identifying NAL units of first samples, the identified NAL units being referenced by NAL units of the selected random access sample referred to as a second sample, the second sample following the first samples, the second sample in the ISOBMFF track requiring at least some of the NAL units of the first samples to be decoded,
- obtaining the identified NAL units, and
- generating a video bit-stream comprising the obtained NAL units.

Accordingly, the method of the invention makes it possible to improve video streaming by enabling access to random pictures in video streams while improving the use of the resources of a decoder and the transmission bandwidth.

According to a particular embodiment, the NAL units of the first samples comprise non video coding layer (VCL) NAL units and the SampleGroupDescriptionBox contains entries to reference the first samples, the method further comprising gathering the identified NAL units in the second sample in response to processing the entries.

According to a particular embodiment, the identified NAL units are prefix and/or suffix adaptation parameter set (APS) NAL units and the gathering comprises rewriting of suffix APS NAL units as prefix APS NAL units.

According to a particular embodiment, the entries are of the APSRollRecoveryEntry type.

According to a particular embodiment, the entries comprise a particular parameter indicating a set of samples from which at least some of the non-VCL NAL units are required to decode the second sample, the samples of the indicated set of samples corresponding to the first samples.

According to a particular embodiment, the entries comprise a particular parameter indicating samples within a set of samples, from which at least some of the non-VCL NAL units are required to decode the second sample, the samples of the indicated set of samples corresponding to the first samples.

According to a particular embodiment, the entries comprise a number of samples composing a set of samples from which at least some of the non-VCL NAL units are required to decode the second sample.

According to a particular embodiment, the specific data structure further comprises a NALUMapEntry referencing NAL units of the first samples that are required to decode at least partially the second sample.

According to a particular embodiment, the NAL units of the first samples that are required to decode at least partially the second sample are indicated with a particular value of a group ID of the NALUMapEntry.

According to a particular embodiment, NAL units of the first samples that are required to decode at least partially the second sample are declared as belonging to a same 'roll' sample group.

According to a particular embodiment, the second sample is marked as a partial sync sample or as a stream access point (SAP) of type 4.

According to a third aspect of the invention, there is provided a device for comprising a processing unit configured for carrying out each of the steps of the method described above. The third aspect of the present invention has optional features and advantages similar to the first, second, and third above-mentioned aspects.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

According to embodiments, NAL units are read from a compressed video bit-stream so as to organize data of the bit-stream into an encapsulated file. The type of some NAL units and/or the identifier of data within encoded within these NAL units are decoded to determine the role of the NAL units, in particular whether they are required in case of random access, making it possible to identify and buffer additional NAL units that are required for random access so as to make sure that the encapsulated file enables random access. These additional NAL units are signalled within the encapsulated file so that they can be used when needed, for example when a user is seeking a particular portion in a video sequence. The additional NAL units may be stored in a metadata part of the encapsulated file or in a data part of the encapsulated file.

Still according to embodiments, a video bit-stream encapsulated according to the invention is parsed to extract NAL units. The additional NAL units are identified, from a data part or from a metadata part of the encapsulated file so as to avoid needlessly extracting NAL units.

Figure 2:
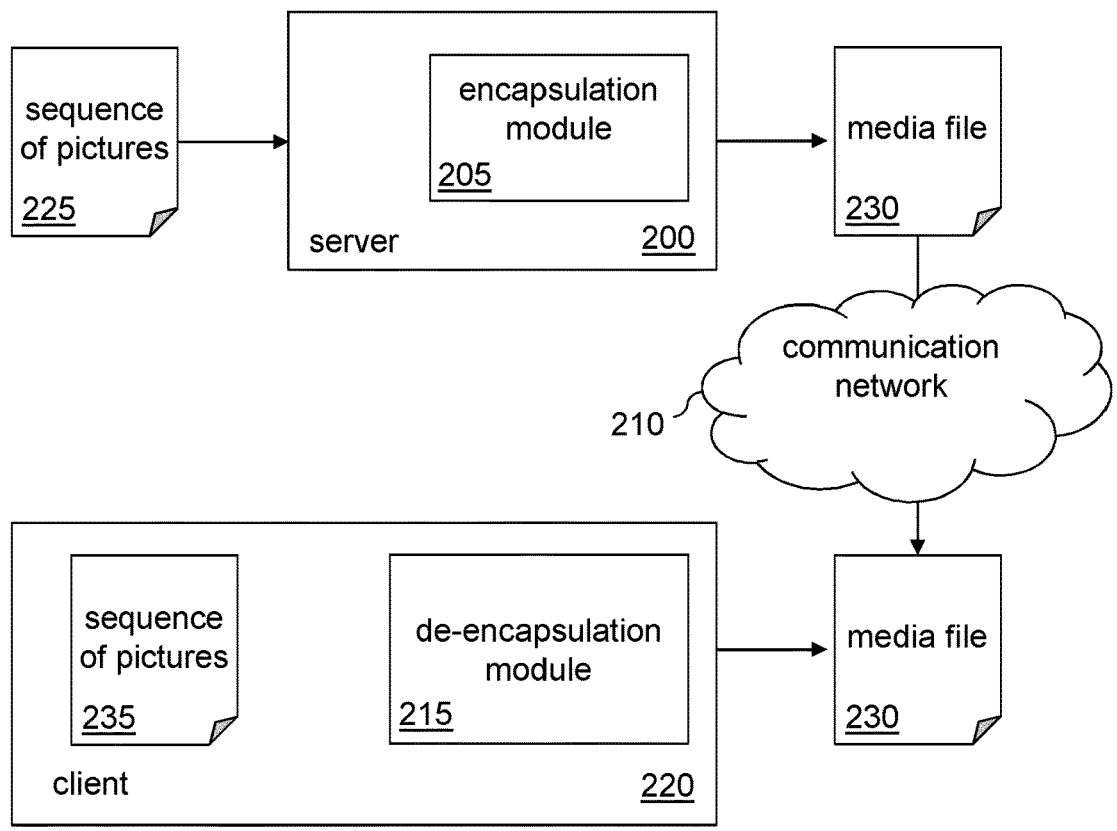
FIG. 2 illustrates an example of streaming media data from a server to a client.

FIG. 2 illustrates an example of streaming media data from a server to a client. As illustrated, a server 200 comprises an encapsulation module 205, connected, via a network interface (not represented), to a communication network 210 to which is also connected, via a network interface (not represented), a de-encapsulation module 215 of a client 220.

Server 200 processes data, e.g. video and/or audio data, for streaming or for storage. To that end, server 200 obtains or receives data comprising, for example, the recording of a scene by one or more cameras, referred to as a source video. The source video is received by the server as an original sequence of pictures 225. The server encodes the sequence of pictures into media data (i.e. bit-stream) using a media encoder (e.g. video encoder), not represented, and encapsulates the media data in one or more media files or media segments 230 using encapsulation module 205. Encapsulation module 205 comprises at least one of a writer or a packager to encapsulate the media data. The media encoder may be implemented within encapsulation module 205 to encode received data or may be separate from encapsulation module 205.

Client 220 is used for processing data received from communication network 210, for example for processing media file 230. After the received data have been de-encapsulated in de-encapsulation module 215 (also known as a parser), the de-encapsulated data (or parsed data), corresponding to a media data bit-stream, are decoded, forming, for example, audio and/or video data that may be stored, displayed or output. The media decoder may be implemented within de-encapsulation module 215 or it may be separate from de-encapsulation module 215. The media decoder may be configured to decode one or more video bit-streams in parallel.

It is noted that media file 230 may be communicated to de-encapsulation module 215 in different ways. In particular, encapsulation module 205 may generate media file 230 with a media description (e.g. DASH MPD) and communicates (or streams) it directly to de-encapsulation module 215 upon receiving a request from client 220. The media file 230 may also be downloaded by and stored on the client 220.

For the sake of illustration, media file 230 may encapsulate media data (e.g. encoded audio or video) into boxes according to ISO Base Media File Format (ISOBMFF, ISO/IEC 14496-12 and ISO/IEC 14496-15 standards). In such a case, media file 230 may correspond to one or more media files (indicated by a FileTypeBox 'ftyp') or one or more segment files (indicated by a SegmentTypeBox 'styp'). According to ISOBMFF, media file 230 may include two kinds of boxes, a "media data box", identified as 'mdat' or 'imda', containing the media data and "metadata boxes" (e.g. 'moov' or 'moof') containing metadata defining placement and timing of the media data. In a particular embodiment, the sequence of pictures 225 is encoded, or compressed, according to the Versatile Video Codec specification ISO/IEC 23090-3.

Encapsulation

Figure 3:
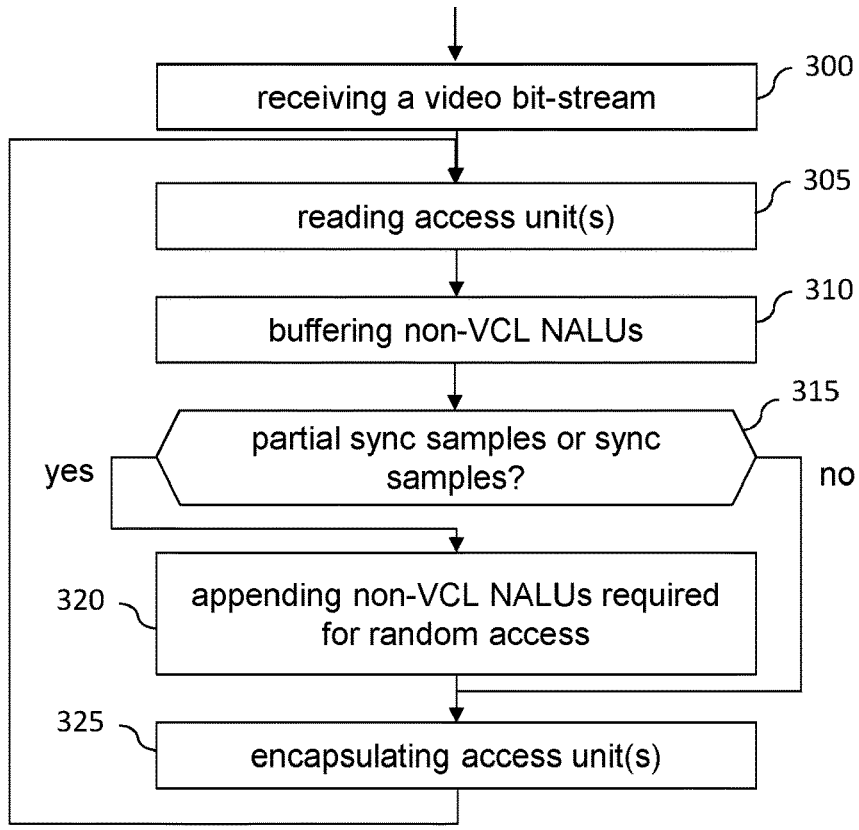
FIG. 3 illustrates an example of steps of an encapsulation process according to a particular embodiment of the invention.

FIG. 3 illustrates an example of steps of an encapsulation process according to a particular embodiment of the invention. As illustrated, a first step is directed to obtaining a compressed video bit-stream (step 300). Such a compressed video bit-stream may be a sequence of NAL units. It may be available in its entirety (for example a pre-encoded compressed video bit-stream read from a storage device or from a memory). Alternatively, the compressed video bit-stream may be generated on the fly (live or real-time encoding).

Next, one or more access units are read (step 305), each access unit being a set of picture units that belong to different layers and contain coded pictures associated with the time for output from the decoded picture buffer (DPB). The number of access units that are read may depend on the buffering capabilities of the module carrying out the encapsulation process, on its configuration (e.g. to generate one file for storage, to generate a file with movie fragments, or to generate media segments for streaming, each media segment possibly with one or more fragments), or the encoding mode (e.g. live or pre-encoded).

For example, when the bit-stream is pre-encoded or available from storage, the module carrying out the encapsulation process may inspect several access units and their corresponding NALUs to have a better knowledge of the bit-stream and to improve the encapsulation.

When the bit-stream comes from live encoding, the module carrying out the encapsulation process may generate a file or media segments containing movie fragments. Typically, the module carrying out the encapsulation module buffers and processes a group of images corresponding to a fragment (e.g. from 0.5 to several seconds of compressed video) before being able to output encapsulated access units.

Figure 1A:
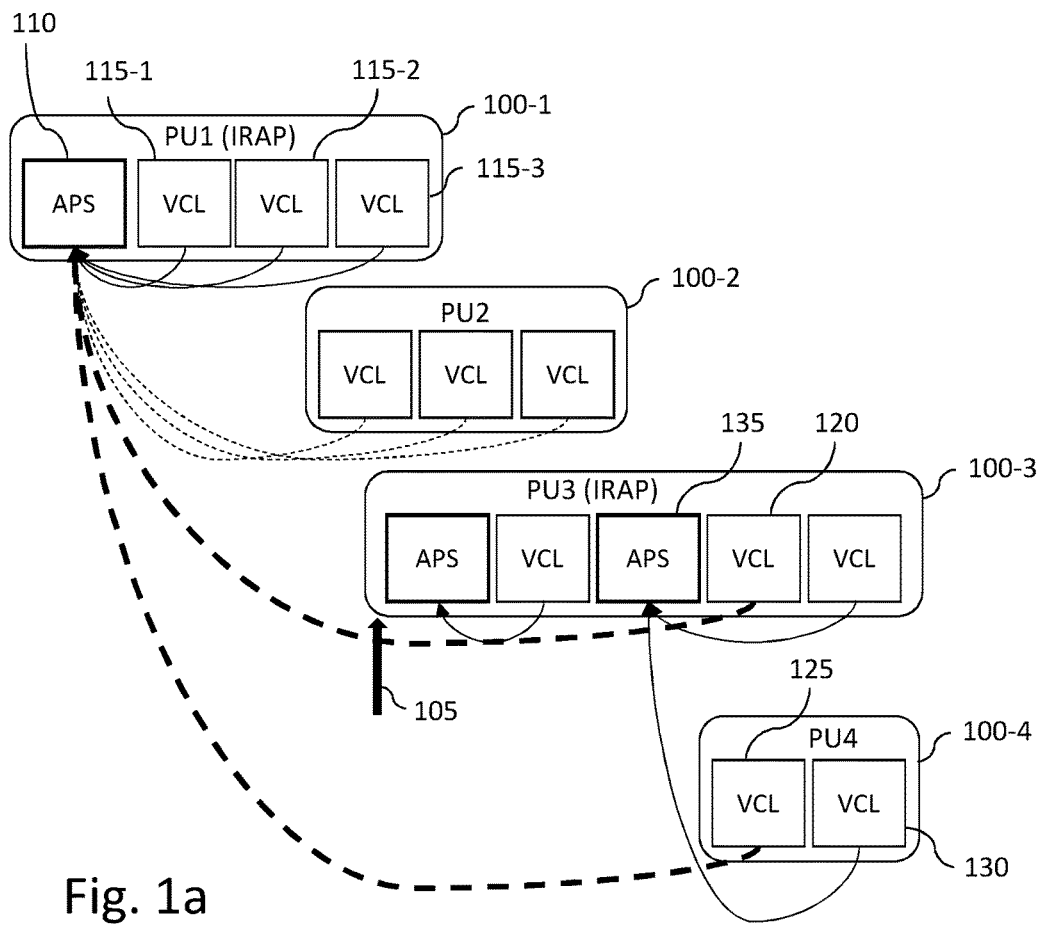
FIGS. 1a and 1b illustrate an example of a sequence of picture units complying with VVC and an example of description of random (or synchronization) samples in the ISO Base media file format, respectively.
Figure 1B:
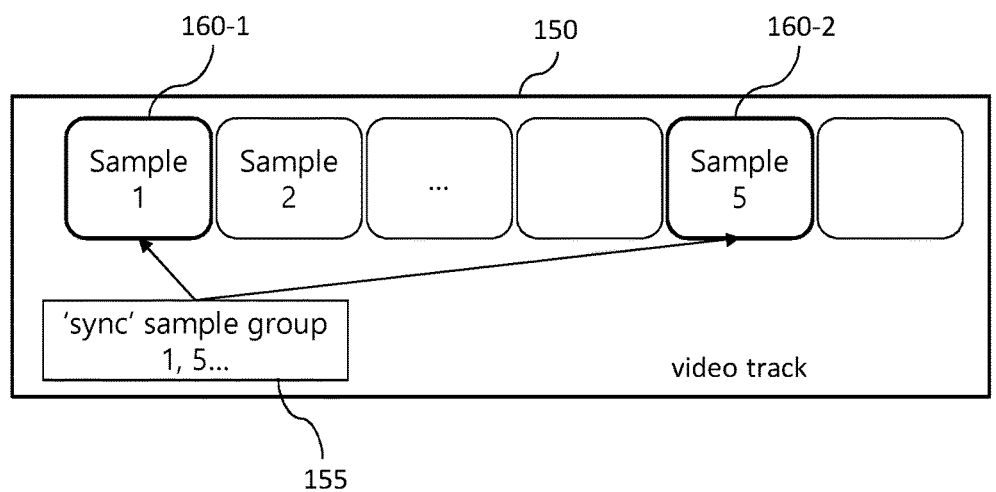

The module carrying out the encapsulation process inspects the NAL units, especially the non-VCL NALUs, from the read access unit(s). It looks for non-VCL NALUs that may be referenced along the video sequence by pictures or access units (for example the non-VCL NAL unit 110 in FIG. 1a). This may be for example an APS NALU, a picture parameter set (PPS) NALU, or a sequence parameter set (SPS) NALU. It may also be an SEI message. It may also be update of an APS, a PPS, or a SPS. An update is a new version of a parameter set which may include new parameters associated with a parameter set identifier already used in the video sequence. The potential non-VCL NAL units that may be useful for random access and referenced by picture units are called parameter sets for sync samples. They correspond to a set of parameters required for decoding a sample starting from a sync sample. The parameters within this set may be associated with an identifier. For example, a video parameter set NAL unit (VPS NAL unit) has an identifier represented by the syntax element vps_video_parameter_set_id. An SPS NAL unit has an identifier represented by the sps_seq_parameter_set_id syntax element. A PPS NAL unit has an identifier represented by the pps_pic_parameter_set_id syntax element. An APS NAL unit also has a syntax element adaptation_parameter_set_id providing an identifier. There may also be several types of APS NAL units. Different types of APS NAL unit define their own identifier space. In this case, the identifier of the non-VCL NAL unit identifier may be a pair of identifier and type.

Next, as illustrated, the non-VCL NAL units are buffered in a memory of the module carrying out the encapsulation process (step 310). This step is described in more detail by reference to FIG. 5a.

Next, from the read access units, it is determined if, from the read access unit(s), one or more samples should be declared as partial synchronization samples or synchronization samples (step 315), also called partial sync, sync, or random access samples, and which of these samples should be considered as partial synchronization samples or synchronization samples. The sync samples may correspond to the IRAPs comprised within the read access units or may correspond only to some of these IRAPs, depending, for example, on a fragmentation or segmentation configuration. For example, it may be decided to declare one sync sample every second even if the input bit-stream provides two or more IRAP pictures per second. Partial synchronization samples are described in more detail hereafter, in particular in reference to FIGS. 8a and 8b.

When declaring a sync sample in the sample description, the encapsulation process appends all or a part of the buffered non-VCL NALUs in the sample description or within the sample data (step 320). This step is described in detail with reference to FIG. 4a. Next, the read access units are encapsulated in the media file or media segment (step 325).

When declaring a partial sync sample in the sample description, the encapsulation process appends instructions for parsers to obtain all or a part of the buffered non-VCL NALUs in the sample description (step 320). This step is described in detail with reference to FIG. 4b (step 474). Next, the read access units are encapsulated in the media file or media segment (step 325).

It is to be noted that the encapsulation described by reference to FIG. 2 may also apply to a media file that is already encapsulated. Accordingly, instead of reading access units from an input video bit-stream (steps 300 and 305), samples are read from an encapsulated file previously received. The encapsulation still decides if and where to place sync samples in the new encapsulated file and appends the non-VCL NALUs that are required for random access. This enables an initial encapsulation that was not suitable for random access or not optimized for random access to provide a single track with random access capabilities. This may be used, in particular, when segmenting a media file encapsulated as one huge media file for streaming. This may also be used for fragmenting a media file encapsulated as a single media file. This may also be used to transform a multi-track encapsulation, e.g. a video track plus one or more non-VCL tracks, into a single track with random access capabilities.

Video tracks generated with the encapsulation process illustrated in FIG. 3 may be further indicated by a specific sample entry type, for example a VisualSampleEntry 'vvcr' or 'vvi2' indicating that this video track is a single track allowing random access and containing indications about additional non-VCL NALUs required for random access that are not useful for normal playout. The 'vvi1' sample entry type in the Working Draft for VVC file format (w19049) may be reused instead of 'vvcr' (or 'vvi2') but a specific sample entry would explicitly indicate that specific signalling is in use in the track for the additional non-VCL NALUs. Considering these sample entry types, the handling of sync samples is specified as follows for encapsulated VVC bitstreams.

When the sample entry name is 'vvc1' or the reused 'vvi1' (or new 'vvi2' or 'vvcr') and the track does not have a track reference of type 'vvcN' (e.g. reference to a non-VCL track like in multi-track approach), the following applies:
  if the sample is a sync sample,
    a. when the sample entry type is 'vvc1', all the parameter sets needed for decoding that sample must be included in the sample entry.
    b. when the sample entry type is 'vvi1 vvi1' (or new 'vvi2' or 'vvcr')', all the parameter sets needed for decoding that sample must be included either in the sample entry or in the sample itself.

otherwise (i.e. the sample is not a sync sample), a. when the sample entry type is 'vvc1', all the parameter sets needed for decoding that sample must be included in the sample entry.

b. when the sample entry type is 'vvi1' (or new 'vvi2' or 'vvcr')', all the parameter sets needed for decoding the sample must be included either in the sample entry or in any of the samples since the previous sync sample to the sample itself, inclusive.

For interoperability purposes, when using 'vvi1' sample entry type, the sync sample may be updated as follows: a sync sample in 'vvi1' (or a specific VisualSampleEntry type like 'vvcr' or 'vvi2') may contain an indication describing, or may contain a specific box providing, the additional non-VCL NALUs required for random access. Examples are provided herein below.

Figure 4A:
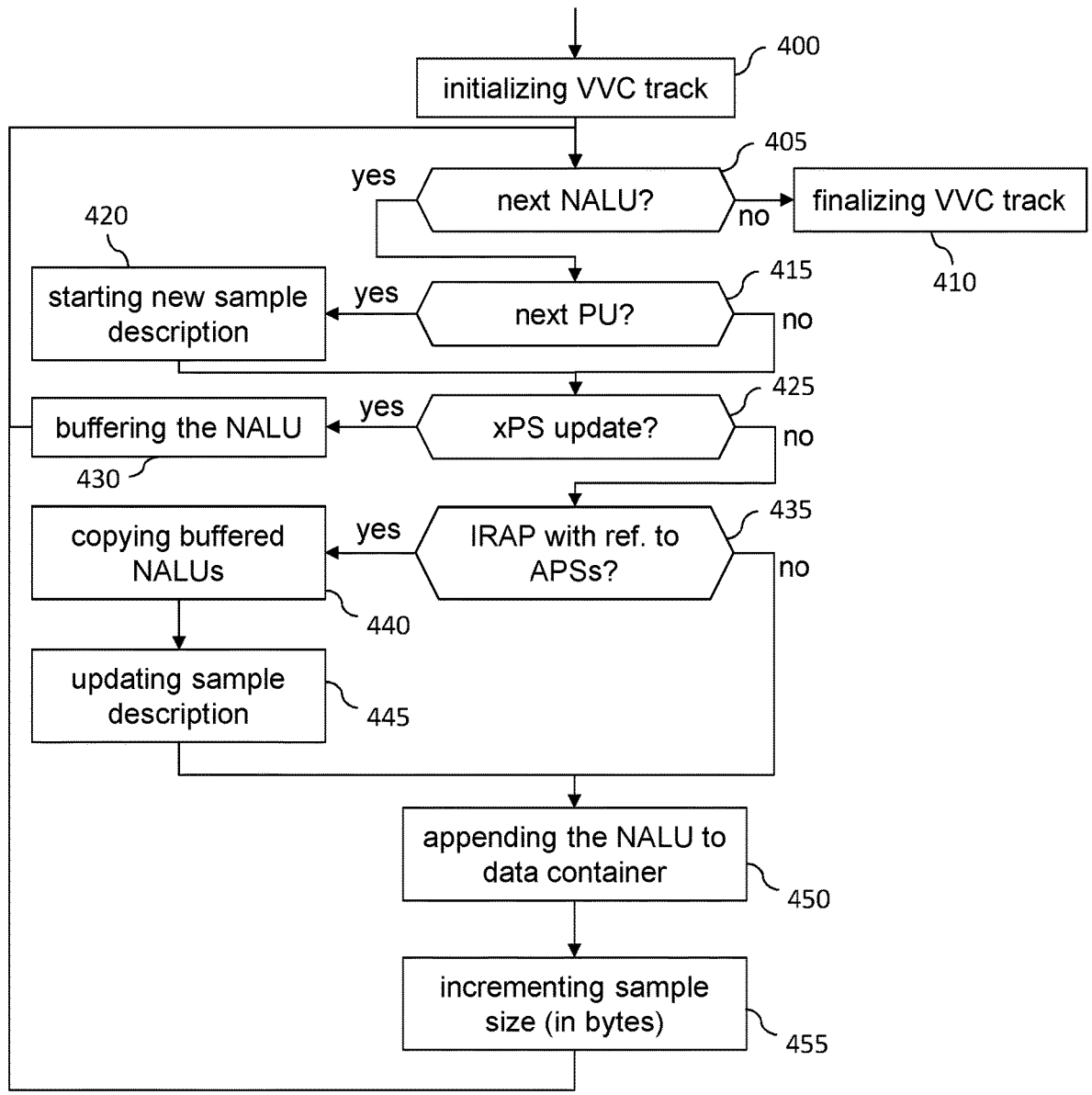
FIGS. 4a and 4b illustrate detail of steps of an encapsulation process according to a particular embodiment of the invention and an example of steps for appending additional data required for a random access, respectively.

FIG. 4a illustrates detail of steps of an encapsulation process according to a particular embodiment of the invention. Such steps may be carried out in an encapsulation module such as encapsulation module 205 in FIG. 2, for example an ISOBMFF writer (referred to as a "writer" hereafter).

As illustrated, a first step is directed to initializing a description of a video track (step 400). For the sake of illustration, a new 'trak' box may be created within a 'moov' box. The handler of the track may be set to 'vide' to indicate that it is a video track.

According to a particular embodiment, the NAL units (NALUs) of the input coded stream (e.g. VVC stream) are successively processed until the end of the stream is reached. To that end, it is determined whether or not there is a next NAL unit to be read (step 405) and, if there is a NAL unit to be read, it is read. If no NAL unit can be found, this terminates the encapsulation process and the track is finalized (step 410). For example, indexing information (e.g. 'sidx' or additional user data or movie fragment random access box) may be computed and inserted in the metadata part of the file.

If a NAL unit to be processed is read in the input VVC bit-stream (step 405), it is checked whether or not the read NAL unit indicates the beginning of a new picture unit (PU) (step 415). This is determined according to the video codec specification used which defines the types of NAL units that are allowed before a new picture unit. If the read NAL unit indicates a new picture unit, a new sample description is started within the sample table box (step 420). For the sake of illustration, this may comprise creating a new NAL unit sample in the media data part of the file (e.g. the 'mdat' box) and in appending a new entry in the boxes describing the samples (e.g. decoding time to sample box, optionally the composition time to sample box, sample size box, sample to chunk box, or track run box when the file is stored as a fragmented file).

Next, it is determined whether or not the NAL unit is an update of a parameter set (step 425), for example a new APS or a PPS. If the NAL unit is an update of a parameter set, the NAL unit, that is a non-VCL NAL unit, is buffered (step 430) and the algorithm loops to step 405 to process the next NAL unit in the input VVC bit-stream. The non-VCL NAL unit detected as an update of a parameter set is also appended to the data container to keep the current picture unit contained as a sample in the data part of the file.

The buffering step 310 or 430 may include buffering the non-VCL for the sample or picture unit being read in 305 or 415 but, when appending the buffered NAL units in the encapsulated bit-stream (step 320 or 440), the ones for the current sample must be included in the sample data (step 325 or 450) and not duplicated and not be marked as additional non-VCL NAL units required for random access. By doing so, the buffer is maintained up to date for next sync samples and the current sample is kept consistent with its representation in the input bit-stream. The step of determining whether or not the NAL unit is an update of a parameter set makes it possible to reduce the number of additional NAL units that are buffered and that may be copied within the description of the random access or synchronization samples. Only those that are relevant or the most recent updates are buffered.

Next, if the NAL unit is not an update of a parameter set (step 425), it is determined whether or not the read NAL unit is part of an IRAP picture and whether it contains a reference to a parameter set for sync sample (e.g. an APS NAL unit for VVC bit-stream) (step 435). For example, in a VVC bit-stream, it is a VCL NALU or a picture header (PH, non-VCL) NAL unit with specific signalling that indicates that the picture unit is an IRAP (based on a VCL NAL unit type corresponding to IRAP types [nal_unit_type in the range of IDR_W_RADL to CRA_NUT] and on gdr_or_irap_pic_flag of PH).

If the read NAL unit is a picture header or the read NAL unit is the first VCL NAL unit with no picture header present in the picture unit, it is determined that the input VVC bit-stream contains a new IRAP picture. Accordingly, it may be decided to encapsulate this IRAP picture as a sync sample.

If the read NAL unit is part of an IRAP picture and if it contains one or more references to a parameter set for sync sample (e.g. an APS NAL unit for VVC bit-stream) buffered in step 430, additional non-VCL NAL units are required to decode the stream from this random access point. As a result, the NAL units buffered at step 430, or a portion of these buffered NAL units, are appended to the encapsulated file (step 440).

According to a first embodiment, these NAL units are stored (or instructions to recover those are stored) in the metadata part of the file, for example in sample description. According to a second embodiment, they are stored in the data part of the file (e.g. in the 'mdat' or 'imda' box within the sample data). When these NAL units are stored in the data part, the sample size is incremented by the length of all the appended NAL units (step 445). When these NAL units are stored in the metadata part, the corresponding box is updated or created (step 445).

Next or if the read NAL unit is not part of an IRAP picture and if it does not contain any reference to a parameter set for sync sample (e.g. an APS NAL unit) present in the buffer, the current NAL unit is appended to the data part of the file (step 450), prefixed by its length in bytes, so as to form a NALU sample according to ISO/IEC 14496-15, and the sample size is updated accordingly with the NAL unit length in the sample size or compact sample size box (step 455). In a variant, the test 435 applies to IRAP and non IRAP pictures and checks whether a picture (through picture header or a slice header) contains one or more references to a parameter set for a sync sample (e.g. an APS NAL unit) present in the buffer, these referenced parameter sets are appended to the encapsulated file with the sample description (in steps 440 and 445).

Figure 4B:
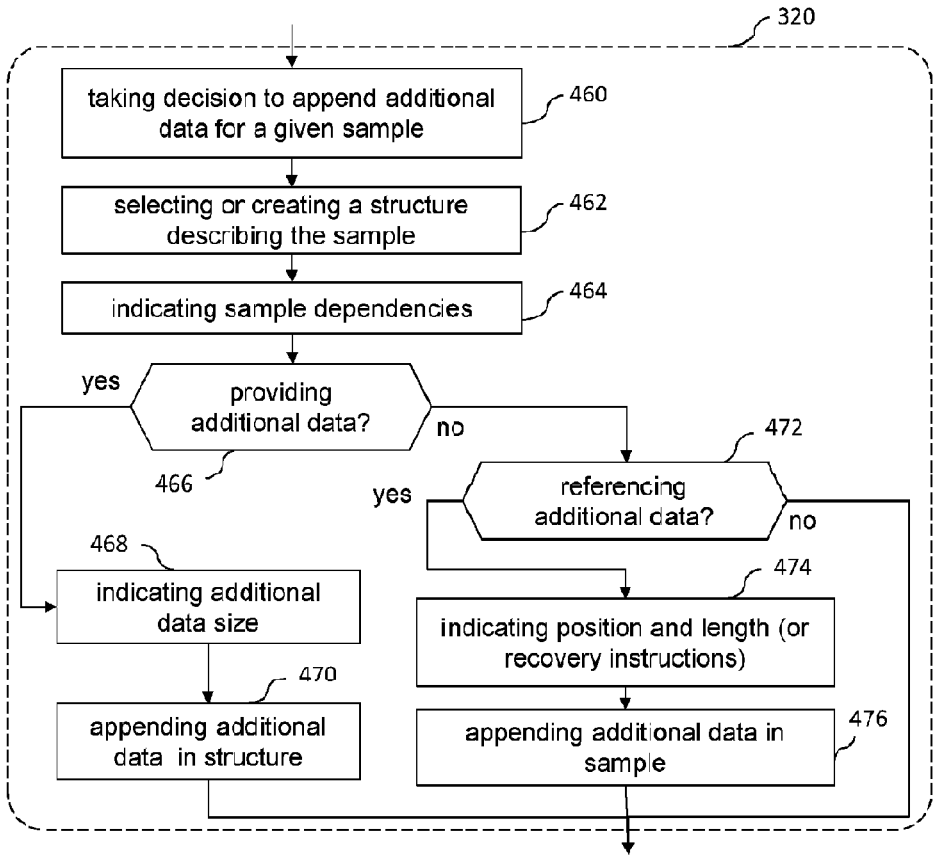

FIG. 4b illustrates an example of steps for appending additional data required for a random access, as performed by the encapsulation process in steps 320 or 440. As illustrated, the process begins when the encapsulation process takes the decision to append additional data in connection with a given sample (step 460). Most of the time, the sample is a sync sample, but there may be additional data also appended within non sync or non-random access samples. In the case of VVC bit-stream, the additional data may consist in parameter set updates or in APS NAL units. Additional data means that these data may not be required during normal playout.

Next, a structure describing the current sample is selected or created (step 462). It may be one box in the sample description, one box in a track fragment, or even a specific NAL-unit like structure in the data part of the file. Such a selected structure is used to set an information, using some box parameters or specific NAL unit types, that indicates that the sample has some dependencies, other than image dependencies, to some additional data in samples or picture units that precede the last sync sample in the decoding order (step 464).

Next, it is decided, depending on the configuration of the encapsulation module, as defined by a user, an application, or a script, whether to provide the additional data in the selected structure (step 466).

If additional data are to be provided, the indication that additional data are provided for the current sample is set in the selected structure and the size of the additional data is set in a parameter of the selected structure (step 468). For the sake of illustration, it may be a dedicated parameter in a box or the NAL unit length if stored as a NAL unit specific structure. Next, the additional data are written in the selected structure, for example as an array of bytes in a box or as a NALU payload in a NAL unit like specific structure (step 470).

On the contrary, if additional data are not to be provided (step 466), the indication that no additional data is provided for the current sample is set in the selected structure. Next, it is decided whether the additional data for the current sample should be referenced or not (step 472), depending on the configuration of the encapsulation module. The choice is recorded in the selected structure.

If the additional data for the current sample should be referenced, it means that the additional data are included within the sample as a one or more regular NAL units. Accordingly, the position of the first byte of this one or more NAL units is set in the selected structure and the length, in bytes, is also set in the selected structure (step 474).

Alternatively, step 474 may consist in providing the reference to required NAL units for random access as recovery instructions instead of copying it. These are instructions for parsers to recover previous or next samples or NAL units to correctly reconstruct a sample or subsample (e.g. a subpicture). The recovery instructions may concern non-VCL NAL units like APS required for random access (for example as described in the embodiment entitled "Using a sample group for recovery of APS required for random access"). The recovery instructions may also concern VCL NAL units, for example in VVC tracks with mixed nal unit types (for example as described in the embodiment entitled "Using recovery at sub-sample level" and "NALUMapEntry and virtual sample group"). A sample containing such recovery instructions may be declared as a partial sync sample.

The position may be specified from the beginning of the file or from the beginning of a movie fragment or relative to the sample offset information for the current sample (available from the sample description, e.g. through SampleSizeBox, SampleToChunkBox or ChunkOffsetBox). Next, the additional data are copied as regular NAL units within the current sample (step 476), preferably as first NAL units for the current sample or before its first VCL NAL unit. In any case, it should be copied within the sample in a position that complies with the NAL unit order defined by the video codec specification. In a variant, the position and length indicating the additional NAL unit within a sample is described as a list of NAL unit index, or as a first byte plus last byte positions.

Examples of structures that may be selected and used for the storage of additional data are described herein below. A sample containing the additional data required for random access may be signaled as a sync sample.

Next, turning back to FIG. 4a, the algorithm loops on step 405 so as to process all the NAL units.

Back to step 440 wherein buffered NAL units are appended to the sample description or to the sample data, it is noted that by default, all the buffered non-VCL NAL units are appended to the sample description or sample data. However, in a particular embodiment, the buffered NAL units are further analysed to append as few NAL units as possible in the sample description or sample data. This analysis may consist, for example when considering a group of pictures, in looking for the non-VCL NAL units referenced by the picture unit of this group of pictures. By doing so, it may be detected, within the encapsulation process, that some buffered non-VCL NAL units are not referenced by any picture unit in the group of pictures. Accordingly, it is not requested to append these non-VCL NAL units in step 440. However, they are preferably retained within the buffer because they may be used in a future group of pictures.

It is to be noted that while FIGS. 4a and 4b are directed to buffering non-VCL NAL units associated with pictures and to appending buffered non-VCL NAL units to other pictures, similar steps may be carried out on subpictures to make it possible to generate partial synchronization samples, as described by reference to FIGS. 8a and 8b.

Figure 5A:
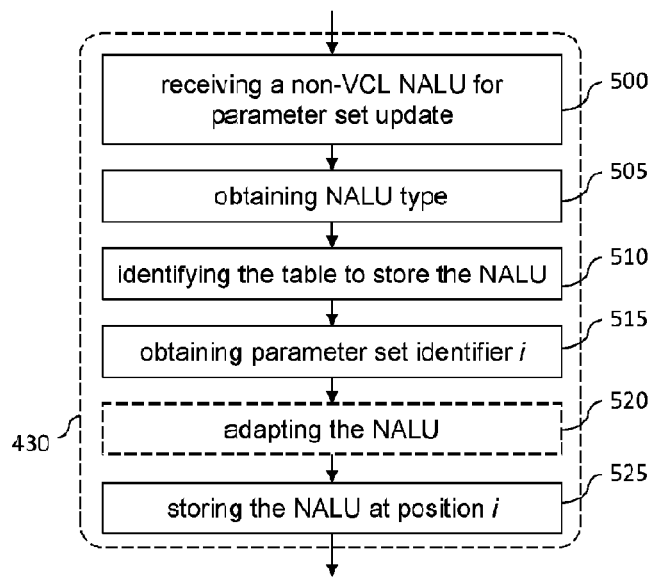
FIGS. 5a and 5b illustrate an example of steps carried out during a step of buffering non-VCL NAL units, as illustrated in FIG. 4a, and an optional step for adapting additional non-VCL NAL units that are required for random access, respectively.

FIG. 5a illustrates an example of steps carried out during a step of buffering non-VCL NAL units, as illustrated in FIG. 4a (i.e. step 430). For the sake of illustration, it is assumed that the internal buffer used for storing non-VCL NAL units corresponding to updates has a pre-defined fixed size. It may contain different tables, for example one table per type of non-VCL NAL unit as defined in the used video codec specification. Alternatively, it may contain different tables depending on the NAL unit type but also on an additional type further refining the information on the purpose of the non-VCL NAL unit. For example, APS NAL units may have an additional type indicating the kind of APS: ALF_APS or LMCS_APS or SCALING_APS. This information requires inspection of the first bits or bytes of non-VCL NAL units. For example, for APS NAL units, this consists in getting the aps_param_type. The size of a table may be set to the maximum allowable number of NAL units for a given type (either NAL unit type, or combination of the NAL unit type and the additional type indicating a kind for a given NAL unit type), according to the video codec specification. The purpose of using a fixed size is for the writer to control the number of buffered non-VCL NAL units and to keep only the latest version of a NAL unit of a given type with a given identifier. This avoids storing too many (and potentially unnecessary) additional non-VCL NAL units. According to a particular embodiment, the size may be determined as a function of the maximum allowable number of parameter sets. This is specified by the video codec specification and then known by the encapsulation module.

It is noted that obtaining the type of a NAL unit is a typical step carried out by a writer, which can be done, for example, when reading the NAL unit (e.g. step 405 in FIG. 4a).

As illustrated, first steps are directed to obtaining a non-VCL NAL unit for parameter set update (step 500) and its type (step 505). The type of the NAL unit may be used to identify a corresponding table where to store the obtained NAL unit. Next, an identifier of the parameter set to which is directed the obtained NAL unit is obtained (step 515). It may be obtained by parsing the beginning of the NAL unit payload, for example to get an adaptation_parameter_set_id from an APS NALU or a picture_parameter_set_id for a PPS NALU. The parsing of such an identifier depends on the type of NAL unit. It may consist in reading the first bits of the NAL unit payload or in decoding a variable length encoded value, for example an Exp-Golomb coded value. The fixed or variable length encoding of the identifier is given by the video codec specification. Optionally, an additional type may also be obtained by NAL unit inspection (e.g. the type of an APS NAL unit).

After having obtained the identifier of the adaptation set, the obtained NAL unit for parameter set update may be adapted (step 520). This optional step is described in more detail in reference to FIG. 5b.

Next, the NALU is stored in the identified table at an index corresponding to the obtained identifier (step 525). This makes sure that the bit-stream resulting from parsing will only contain one instance of a pair of NALU type and adaptation set identifier for a given picture, reducing the processing load for the video decoder and avoiding breaking some compliance rules. For example, the VVC specification states that all SPS, respectively PPS, NAL units with a particular value of sps_seq_parameter_set_id, respectively pps_pic_parameter_set_id, in a CVS, respectively within a picture unit, shall have the same content and that "All APS NAL units with a particular value of adaptation_parameter_set_id and a particular value of aps_params_type within a PU, regardless of whether they are prefix or suffix APS NAL units, shall have the same content".

Figure 5B:
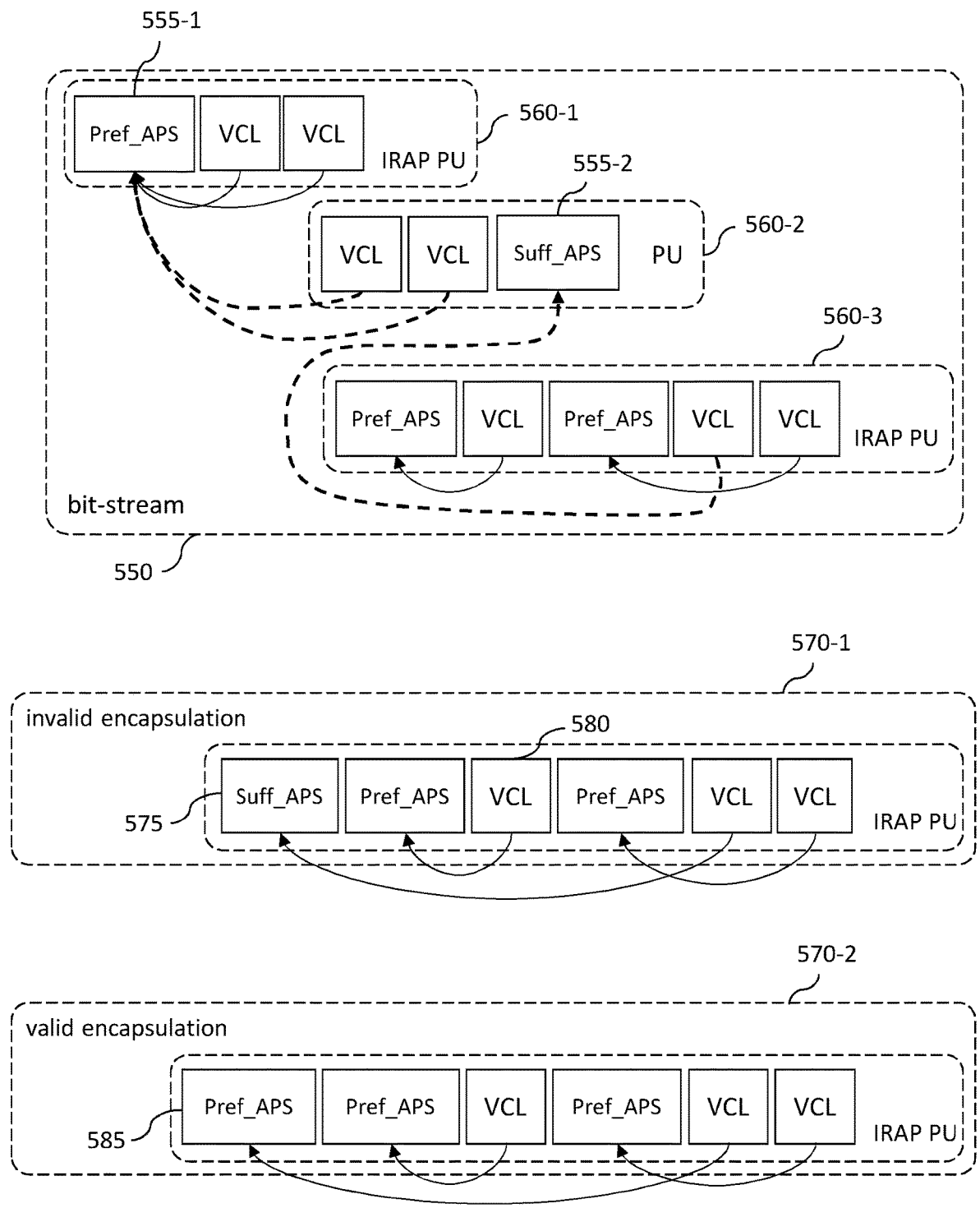

FIG. 5b illustrates an optional step for adapting additional non-VCL NAL units that are required for random access. Some non-VCL NAL units may appear at specific position in the bit-stream with respect to other NAL units. For example, the VVC specification defines prefix and suffix APS NAL units, or prefix and suffix SEI NAL units. The VVC specification specifies their authorized position. When appending such "NAL-order sensitive" NAL units, an adaptation of the NAL unit may have to be done so that the extracted bit-stream does not violate the expected NAL unit order imposed by the video codec specification when it is parsed.

For example, considering the configuration illustrated in FIG. 5b, input bit-stream 550 contains both prefix APS 555-1 and suffix APS 555-2 NAL units. Input bit-stream 500 contains three picture units referenced 560-1 to 560-3, the first one and the third one providing random access into the bit-stream (IRAP PU).

Encapsulated bit-stream 570-1 is an example of direct encapsulation into a NALU sample of PU 560-3 in the 'mdat' box. This encapsulation is invalid because it contains a Suffix APS NAL unit that is placed before the first VCL NAL unit of the sample (Suffix APS 575 is placed before VCL NAL unit 580). When using VVC, the extracted bit-stream by a parser from this encapsulation would lead to a non compliant bit-stream regarding the order of the APS NAL units.

On the contrary, encapsulated bit-stream 570-2 is an example of adaptation of a NAL unit 585 so as to produce a valid NALU sample in the 'mdat' box. From this encapsulation, the extracted bit-stream by a parser would lead to a compliant bit-stream regarding the order of the APS NAL units. Adapting the NAL unit type when copying a non-VCL NAL unit required for random access in a sample may be handled directly by the encapsulation module when encapsulating the sample or may be handled by the parser through a rewriting instruction indicated by the encapsulation module. An example of rewriting instruction is described in reference to FIG. 10.

Parsing

Figure 6A:
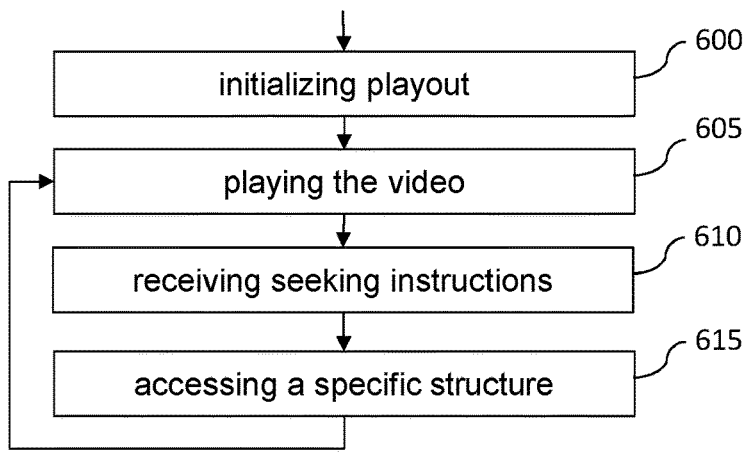
FIGS. 6a and 6b illustrate an example of steps of a parsing process according to a first and a second embodiment of the invention, respectively.

FIG. 6a illustrates an example of steps of a parsing process according to a first embodiment of the invention. According to this embodiment, the additional non-VCL NAL units that are required for random access are stored within the metadata part of the file.

As illustrated, a first step is directed to initializing a media player to start reading a media file encapsulated according to the invention (step 600). Next, the media player plays the file, processing the metadata as for classical NALU-based encapsulation, getting samples from the data part of the file (step 605).

When a user seeking a particular portion in the played video sequence selects an entry from which the video is to be restarted (step 610), the parser accesses a specific structure (step 615) to obtain the additional NAL units that are required for playing the video from the selected entry (i.e. random access) and put these NAL units as the first NAL units in the extracted bit-stream that is provided to the video decoder.

Examples of such a specific structure are given herein below.

Next, the other NALUs are extracted from the 'mdat' box according to the sample description in the metadata part. As illustrated, the algorithm loops to step 605 so that the player keeps on playing the file (until the end of the file, a new seeking instruction, or a stop instruction), without getting the additional NAL units stored in the specific metadata structure. By doing so, only the seek or the start of the playout at a given random access point requires additional processing steps for the parser and for the video decoder. In addition, no redundant NALUs are required within the video bit-stream.

Figure 6B:
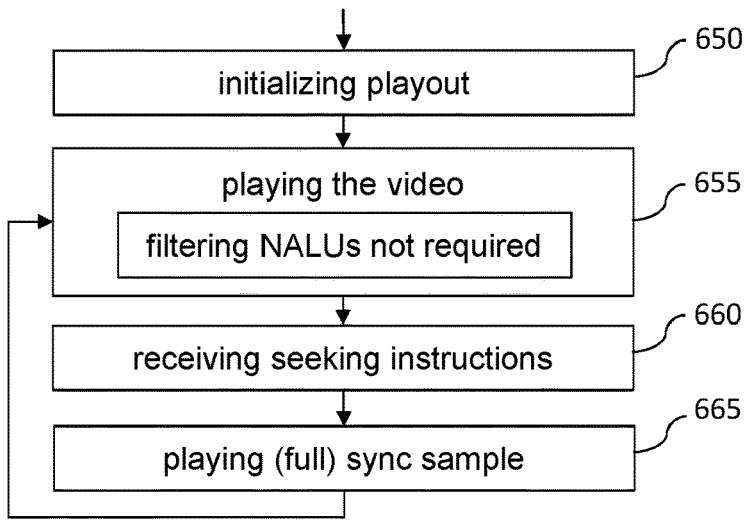

FIG. 6b illustrates an example of steps of a parsing process according to a second embodiment of the invention. According to this embodiment, the additional NAL units required for random access are stored within the data part of the file (either as regular NAL units or as specific NAL units).

As illustrated, a first step is directed to initializing a media player to start reading a media file encapsulated according to the invention (step 650). Next, the media player plays the file (step 655). To that end, each time the media player encounters a random access or a synchronization sample, it further checks whether the corresponding sample contains additional NAL units that are only required for random access. During normal playout, the parser skips (or filters) the additional NAL units, using information directly from the NAL units or from certain metadata structures (e.g. specific box or sample group or NALU mapping information).

When a user seeking a particular portion in the played video sequence selects an entry from which the video is to be restarted (step 660), the parser does not filter the additional NAL units and provide both the additional NAL units required for random access and the NAL units for the random access sample to the video decoder (step 665).

Next, as illustrated, the algorithm loops to step 655 so that the player keeps on playing the file (until the end of the file, a new seeking instruction, or a stop instruction), while filtering the NAL units not required (those marked as additional NALUs required for random access).

Examples of structures enabling NALU filtering are given herein below.

Device for Encapsulation or Parsing

Figure 7:
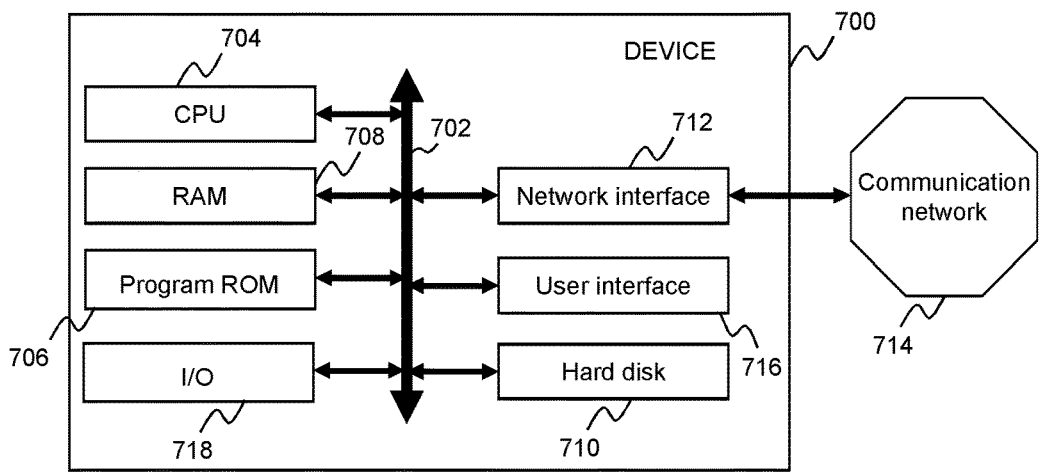
FIG. 7 schematically illustrates a processing device configured to implement at least one embodiment of the present invention.

FIG. 7 is a schematic block diagram of a computing device 700 for implementation of one or more embodiments of the invention. The computing device 700 may be a device such as a micro-computer, a workstation or a light portable device. The computing device 700 comprises a communication bus 702 connected to:

- a central processing unit (CPU) 704, such as a microprocessor;
- a random access memory (RAM) 708 for storing the executable code of the method of embodiments of the invention as well as the registers adapted to record variables and parameters necessary for implementing the method for transmitting media data, of which the memory capacity can be expanded by an optional RAM connected to an expansion port for example;
- a read only memory (ROM) 706 for storing computer programs for implementing embodiments of the invention;
- a network interface 712 that is, in turn, typically connected to a communication network 714 over which digital data to be processed are transmitted or received. The network interface 712 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 704;
- a user interface (UI) 716 for receiving inputs from a user or to display information to a user;
- a hard disk (HD) 710;
- an I/O module 718 for receiving/sending data from/to external devices such as a video source or display.

The executable code may be stored either in read only memory 706, on the hard disk 710 or on a removable digital medium for example such as a disk. According to a variant, the executable code of the programs can be received by means of a communication network, via the network interface 712, in order to be stored in one of the storage means of the communication device 700, such as the hard disk 710, before being executed.

The central processing unit 704 is adapted to control and direct the execution of the instructions or portions of software code of the program or programs according to embodiments of the invention, which instructions are stored in one of the aforementioned storage means. After powering on, the CPU 704 is capable of executing instructions from main RAM memory 708 relating to a software application after those instructions have been loaded from the program ROM 706 or the hard-disc (HD) 710 for example. Such a software application, when executed by the CPU 704, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

VVC Bit-Stream with Mixed Nal Unit Types Encapsulated in a Single VVC Track

Figure 8A:
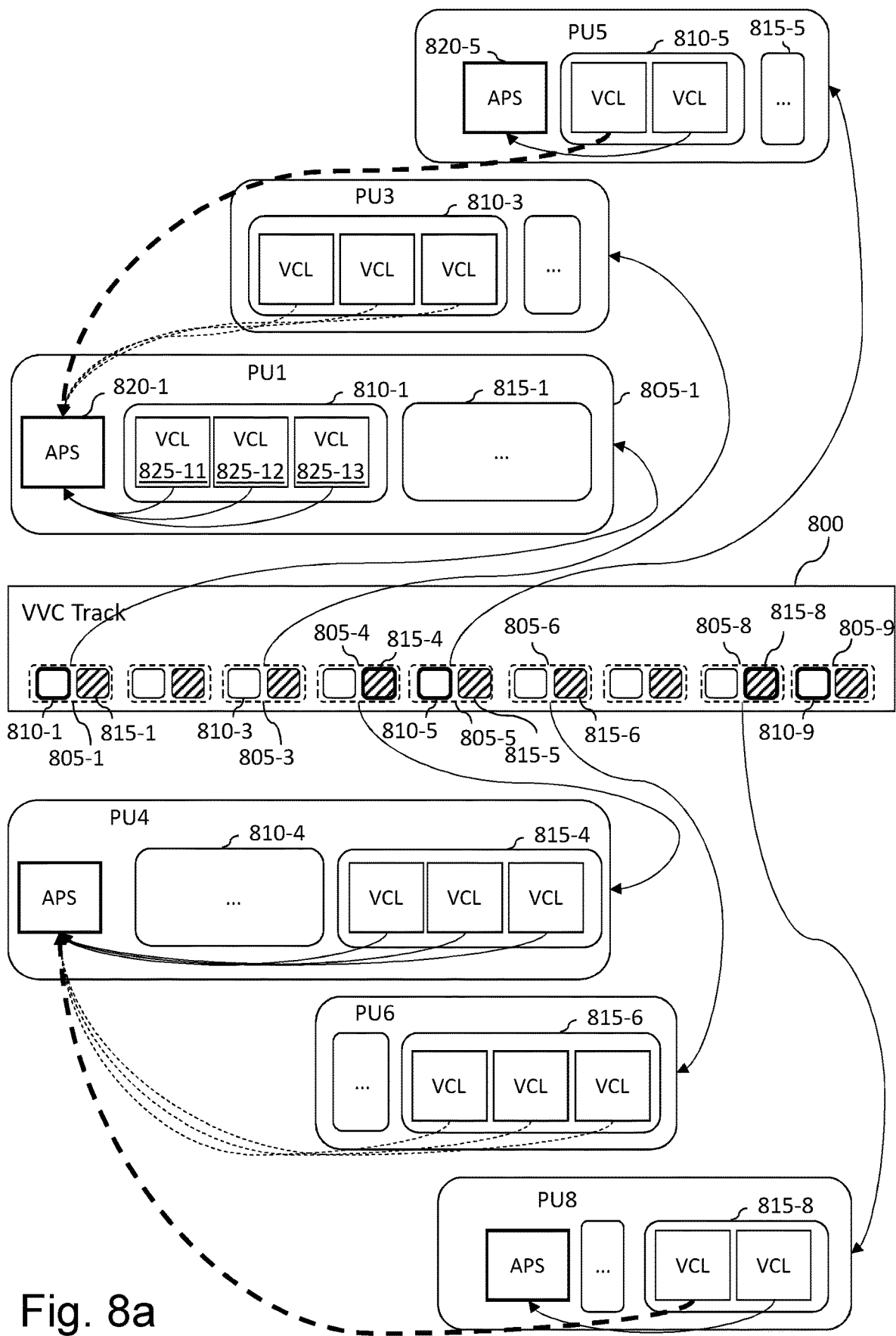
FIG. 8a illustrates an example of a VVC bit-stream with mixed nal_unit types encapsulated in a single VVC track.

FIG. 8a illustrates an example of a VVC bit-stream with mixed nal_unit types encapsulated in a single VVC track.

Track 800 is a VVC track encapsulating a VVC bit-stream containing at least two (different) subpictures. As illustrated, each sample or picture associated with a picture unit (PU) in this VVC track comprises the VCL NAL units of each subpicture at a decoding time and, if appropriate, one or several non-VCL NAL units. For example, picture unit 805-1 comprises VCL NAL units of a first subpicture referenced 810-1 and VCL NAL units of a second subpicture referenced 815-1 (at least partially different from the first subpicture). In addition, picture unit 805-1 comprises non-VCL NAL unit 820-1. In turn, subpicture 810-1 comprises VLC NAL units 825-11 to 825-13 and subpicture 810-2 comprises other VLC NAL units (not represented).

For the sake of illustration, VVC track 800 contains only two subpictures, each subpicture containing one or several VCL NAL units. However, VVC track 800 may contain more than two subpictures, the number of subpictures being indicated by the VVC profile tier or level. Likewise, each subpicture may contain one or more slices or VCL NAL units.

The VCL NAL units corresponding to these subpictures may have mixed nal unit types. This is determined by the encapsulation module when parsing the general constraints or a parameter set, for example the PPS, of the VVC bit-stream. For example, some VCL NAL units (or slices) of a subpicture may have a NAL unit type equal to IDR_W_RADL, IDR_N_LP, or CRA_NUT. These correspond to instantaneous decoding refresh subpictures or the clean random-access subpictures, such as subpictures referenced 810-1, 810-5 or 810-9 (represented with white outlined boxes). These indicate that random access is possible onto these subpictures. The VCL NAL units of the other subpictures in the picture, with the same decoding time, have NAL unit type equal to TRAIL_NUT, indicating that no random access is possible onto these subpictures, such as subpictures 810-3 and 815-6 (represented with white or hashed boxes that are not outlined).

When a random access is possible onto one of the subpictures but not onto another one, only a partial synchronization can be carried out. The corresponding sample may be called a partial sync sample. For example, sample 805-1 (corresponding to PU1), 805-5 (corresponding to PU5), 805-9 (corresponding to PU9), 805-4 (corresponding to PU4), or 805-8 (corresponding to PU8) may be signalled as partial sync sample. For partial sync samples, several picture units must be processed before making it possible to decode the full picture without reconstruction errors. This is in opposition to sync samples for which the corresponding picture can be reconstructed without error and without any additional picture units.

VVC tracks like VVC track 800 are such that each subpicture may have its own random-access period or refresh period. For example, the first subpicture (i.e. subpictures 810-1 to 810-9 in the illustrated example) has a refresh period of 4 samples and the second subpicture (i.e. subpictures 815-1 to 815-9 in the illustrated example) also has a refresh period of 4 samples. While the shown refresh periods are the same for the two subpictures in FIG. 8a, they may be different.

Figure 8B:
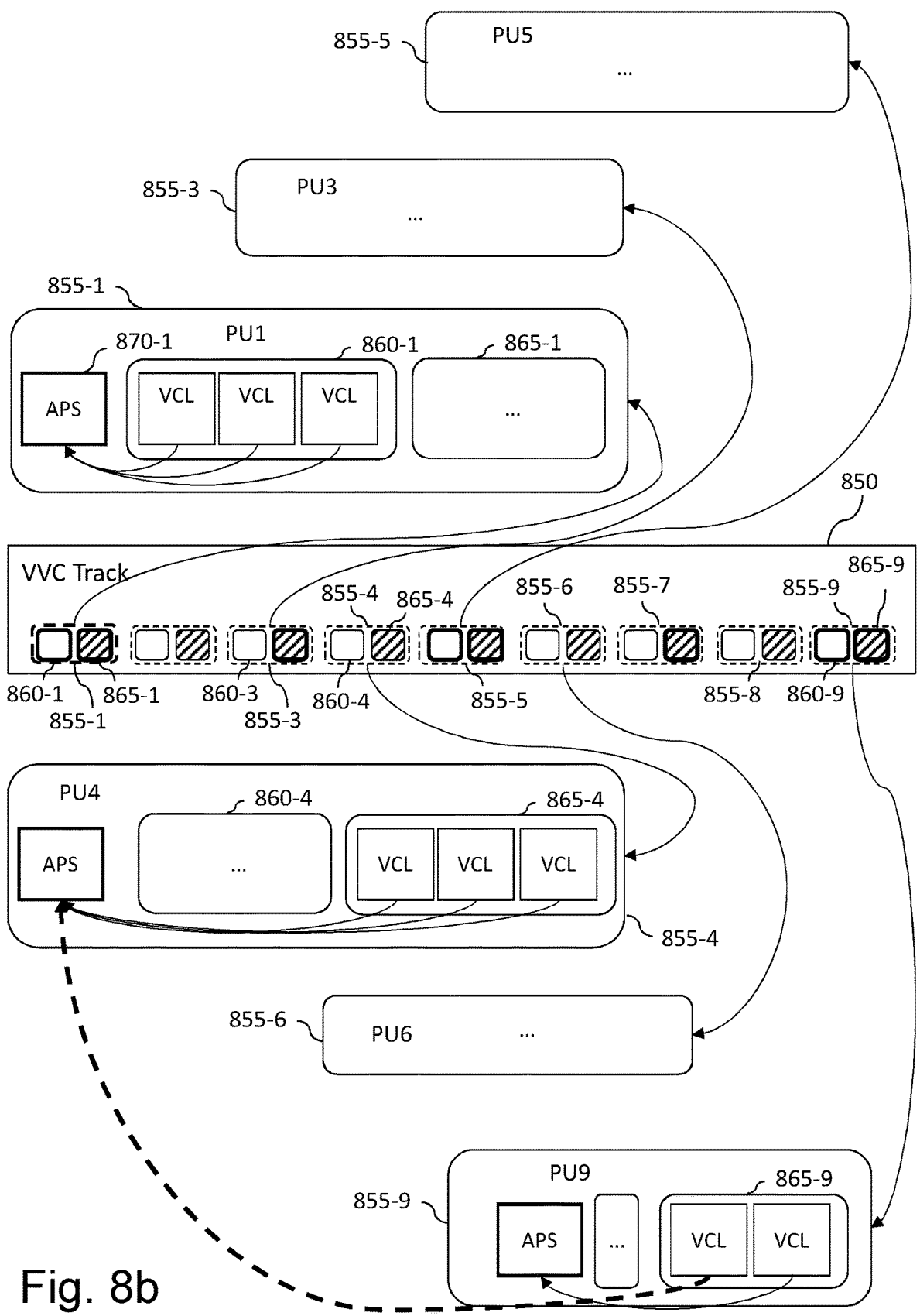
FIG. 8b illustrates an example of a VVC bit-stream with mixed nal_unit types encapsulated in a single VVC track with sync and partial sync samples.

FIG. 8b illustrates an example of a VVC bit-stream with mixed nal_unit types encapsulated in a single VVC track containing sync samples and partial sync samples.

Track 850 is a VVC track encapsulating a VVC bit-stream containing at least two (different) subpictures. As illustrated, each sample or picture associated with a picture unit (PU) in this VVC track comprises the VCL NAL units of each subpicture at a decoding time and, if appropriate, one or several non-VCL NAL units.

For example, picture unit 855-1 comprises VCL NAL units of a first subpicture referenced 860-1 and VCL NAL units of a second subpicture referenced 865-1 (at least partially different from the first subpicture). The picture unit 855-1 may contain non-VCL NAL units like parameter set or picture header, for example an APS NAL unit 870-1, used for the decoding of one or more or all subpictures contained in the picture unit.

For the sake of illustration, VVC track 850 contains only two subpictures, each picture containing one or several VCL NAL units. However, VVC track 850 may contain more than two subpictures, the number of subpictures being indicated by the VVC profile, tier or level in a non-VCL NAL unit. Likewise, each subpicture may contain one or more slices or VCL NAL units.

Some samples in VVC track 850 correspond to picture units with mixed nal unit types, as indicated in the PPS of the VVC bitstream. The first subpicture has a refresh period of four samples and the second subpicture has a refresh period of two samples. Considering these examples of refresh periods, samples in the encapsulated file (corresponding to picture units in the bit-stream) may be signalled as sync samples, such as sample 855-1 (corresponding to PU1), sample 855-5 (corresponding to PU5), and sample 855-9 (corresponding to PU9), or as partial sync samples, such as sample 855-3 (corresponding to PU3) and sample 855-7 (corresponding to PU7).

When a VVC bit-stream is encoded with the same refresh period for all the subpictures, there is some advantages for a VVC track encapsulating this bit-stream to signal this information. This informs parsers or players on the random access granularity (e.g sample/picture level or subsample/ subpicture level). To that end, a sample entry type may be used. For example, the sample entry types 'vvc1' or 'vvi1' may correspond to VVC tracks without mixed nalu type in use, while other sample entry types like 'vvc2' or 'vvi2' (or any new four character code reserved for this purpose, and not conflicting with an existing one) may be used to warn parsers on the possibility to encounter mixed nalu types in some samples of the track.

For 'vvc1' or 'vvi1' tracks, a sync sample may be defined, when subpictures are present in the VVC track, as follows: "if subpictures are present in a sample, this sample is a sync sample only if all subpictures present in this sample have the same VCL NAL unit type indicating an IRAP subpicture".

This distinction may also be signalled, using an ISOBMFF brand in the 'ftyp' box of the file or the 'styp' box of a segment. This is useful because there may be specific signalling in the encapsulated file or segment concerning random access samples. For example, a partial sync sample may provide random access, at least spatially (e.g. for some subpictures). A partial sync sample may be signalled using a specific Stream Access Point type (e.g. SAP_Type=7 for partial random access). A SAP of type 7 is marked as a member of a sample group or of a NAL unit mapping providing either recovery instructions for APS NAL units (or non-VCL NAL units required for random access) or recovery instructions for VCL NAL units at a subsample or NAL unit level (e.g. subpicture) or both. A partial sync sample may be associated with recovery instructions between the spatial random access and the full picture decoding as further described in some embodiments.

A new SAP type may be defined to indicate that a sample of a track is a partial sync sample in the sense that it allows random access only on some spatial parts of the sample (e.g. a subpicture within the sample is an IRAP while another subpicture of this same sample is not). Some other spatial parts (e.g. subpictures) of this same sample may be decoded with reconstruction errors for a number of consecutive samples, until an IRAP for these other spatial parts is decoded. For example, sample 805-5, corresponding to PU5, which contains non-VCL NAL unit 820-5, in FIG. 8*a*, may be defined as a partial sync sample because it refers to a non-VCL NAL unit 820-1 from a previous sample. Moreover, to correctly reconstruct the corresponding sample PU5, previous NAL units for the second subpicture may be required because the second subpicture denoted 815-5 is not an IRAP subpicture.

As an alternative to a new SAP type, when mixed VCL NAL unit types are used in a sample, like in track 800, some subpictures may be IDR or CRA while other subpictures are not. These samples are treated as gradual decoding refresh and the roll recovery period may be indicated using the 'roll' sample group or the sample group for APS recovery or both. These samples, also called partial sync samples, may be signalled with a SAP Type equal to 4.

Only some samples in the track, depending on the refresh periods, may have all their subpictures aligned in terms of random access, at given decoding times. In such a case, these samples may be signalled as sync sample, for example in the SyncSampleBox or in a 'sync' sample group. These kinds of random access for these samples may be indicated by the encapsulation module in a 'sap' sample group. An additional sample group may provide for a range of NAL units how many samples to roll over before getting a sync sample for a given subpicture. This signalling may be independent of any subpicture signalling (e.g. sample group or NAL unit mapping or specific box structure) or combined with subpicture signalling, for example sample group or NAL unit mapping or specific box structure providing subpicture information like position or size or identifier.

Encapsulating Additional Non-VCL NALUs for Random Access within a Metadata Part of a File Several alternatives are described for this embodiment according to which the additional non-VCL NAL units that are required for random access are stored within the metadata part of the encapsulated file.

It is recalled that the ISO/IEC 14496-12 provides tools for description of random access or synchronization samples in a track. For example, the Sync sample box provides a compact marking of sync samples within the stream. The table is arranged in strictly increasing order of sample number and is defined as follows:

```
aligned(8) class SyncSampleBox
    extends FullBox('stss', version = 0, 0) {
    unsigned int(32)    entry_count;
    int i;
    for (i=0; i < entry_count; i++) {
        unsigned int(32)    sample_number;
    }
}
``` where sample_number gives, for each sync sample in the stream, its sample number.

This box may be used by media players or parsers to locate which is the first sync sample prior to a specified seek or start time.

Extension of SyncSampleBox, Containing Only Past APS for a Sync Sample

In a particular embodiment, the SyncSampleBox is extended to provide, for each declared sync sample, the required APS NAL units for random access to this sync sample (the part in bold). The encapsulation process may use this version of the box in the step of copying the required APS NAL units for random access (e.g. step 440 in FIG. 4*a*). A de-encapsulation (or parser) module such as de-encapsulation module 215 in FIG. 2, receiving this new version of the SyncSampleBox, may retrieve the required APS NAL units required for random access when needed (e.g. step 615 in FIG. 6*a*). This embodiment keeps the APS NAL units for the sync sample in the data part of the file.

```
aligned(8) class SyncSampleBox extends FullBox('stss', version, 0) {
    unsigned int(32)    entry_count;
    for (int i=0; i < entry_count; i++) {
        unsigned int(32)    sample_number;
        if (version >= 1) {
            unsigned int(8) numNalus;
            for (int i=0; i< numNalus; i++) {
                unsigned int(16) nalUnitLength;
                bit(8*nalUnitLength) nalUnit;
            }
        }
    }
}
``` where
- numNALUs indicates the number of APS NAL units required for random access to a given sync sample (i.e. to start decoding from the first NAL unit for this sync sample). This corresponds to the APS NAL units occurred in the bit-stream before the first NAL unit of the given sync sample,
- nalUnitLength indicates the length in bytes of the NAL unit, and
- nalUnit contains an APS NAL unit, as specified in the video codec specification, for example ISO/IEC 23090-3.

Extension of SyncSampleBox, Containing Only APS, Possibly Past and Current

In a particular embodiment, the SyncSampleBox is extended to provide, for each declared sync sample, the required APS NAL units for this sync sample (the part in bold). A parameter or flag, called for example all_APS, indicates whether this box contains the full list of APS (past+current) or only the past ones required for random access. The encapsulation module may use this version of the box in the step of copying the required APS NALUs for random access (e.g. step 440 in FIG. 4*a*). The parameter or flag is set to true when the encapsulation module buffered and stored the APS required for random access plus the ones for the current sync sample. When the encapsulation module only buffered and stored APS NALUs that occurred before the first NALU of the sync sample, it sets the parameter or flag to false. Using this embodiment, a de-encapsulation (or parser) module, such as de-encapsulation module 215 in FIG. 2, analyzing this new version of the SyncSampleBox, may retrieve the required APS NALUs for random access when needed (e.g. step 615 in FIG. 6*a*) and possibly those for the current sync sample. This variant may be an alternative providing a single VVC track instead of a VVC track plus another non-VCL track dedicated to the storage of APS NAL units. Such track may be identified by a specific sample entry type.

```
aligned(8) class SyncSampleBox    extends FullBox('stss', version, 0) {
    unsigned int(32)    entry_count;
    for (int i=0; i < entry_count; i++) {
        unsigned int(32)    sample_number;
        if (version >= 1) {
            unsigned int(1) all_APS;
            unsigned int(7) numNalus;
            for (int i=0; i< numNalus; i++) {
                unsigned int(16) nalUnitLength;
                bit(8*nalUnitLength) nalUnit;
            }
        }
    }
}
``` where
- All_APS flag when set to true, indicates that the all APS NAL units required to decode the given sync sample (past+current) are present in the box (the APS NAL unit corresponding to the given sync sample is not in the data part of the file, to avoid duplication). When set to false, it indicates that only the APS NAL units from previous picture units are present in the box (the APS NAL units for the sync sample are in the data part of the file),
- numNALUs indicates the number of APS NALUs present in the box for a given sync sample,
- nalUnitLength indicates the length in bytes of the NAL unit, and
- nalUnit contains an APS NAL unit, as specified in the video codec specification, for example ISO/IEC 23090-3.

In a variant, the all_APS flag may be declared at box level, using a specific value of the flag parameter. The indication would then apply to all the sync samples declared in the box. The previous variant offers more flexibility by allowing a description at sync sample level, instead of track level with this variant. On the other hand, this variant avoids the need for a parser to check on a sync sample basis and can apply the same processing to get APS for every sync sample.

Extension of SyncSampleBox, Containing Non-VCL NALUs, Possibly Past and Current

In a particular embodiment, a new version of the SyncSampleBox is used to provide the required APS NAL units for random access but also possibly other non-VCL NAL units that are required for random access. This extension may be described as follows:

```
aligned(8) class SyncSampleBox extends FullBox('stss', version, 0) {
    unsigned int(32)    entry_count;
    for (int i=0; i < entry_count; i++) {
        unsigned int(32)    sample_number;
        if (version >= 1) {
            unsigned int(8) numArrays;
            for (j=0; j < numArrays; j++) {
                unsigned int(1) array_completeness;
                bit(1) reserved = 0;
                unsigned int(6) NAL_unit_type;
                unsigned int(16) numNalus;
                for (i=0; i< numNalus; i++) {
                    unsigned int(16) nalUnitLength;
                    bit(8*nalUnitLength) nalUnit;
                }
            }
        }
    }
}
``` where
- numArrays indicates the number of arrays of NAL units of the indicated type(s), array_completeness when equal to 1, indicates that all NAL units of the given type are in the following array and none are in the stream and when equal to 0, indicates that additional NAL units of the indicated type may be in the stream; the default and permitted values are constrained by the sample entry name, NAL_unit_type indicates the type of the NAL units in the following array (which must be all of that type); it takes a value as defined in the video codec specification for non-VCL NAL units, numNalus indicates the number of NAL units of the indicated type for the sync sample to which this entry applies, nalUnitLength indicates the length in bytes of the NAL unit, and nalUnit contains a non-VCL NAL unit, as specified in the video codec specification, for example ISO/IEC 23090-3.

In a variant, there is no array_completeness parameter (assumed to be set to false). The arrays of non-VCL NAL units within the box are not complete, in the sense that they do not contain the non-VCL NAL units for a given sync sample, but only those coming from previous samples (or picture units in the bit-stream). This variant corresponds to an encapsulation where the encapsulation module, such as encapsulation module 205 in FIG. 2, buffers all non-VCL NAL units detected up to the first NALU of a new IRAP (e.g. in step 425 in FIG. 4a).

Dedicated Structure for Additional Random Access NALUs ('Aran')

In a particular embodiment, instead of declaring the additional NAL units required for random access in the SyncSampleBox, a distinct box is used. In tracks with a sample entry type indicating a self-contained track suitable for random access, instead of using the SyncSampleBox, the following box may be used to describe the sync samples.

The box, named for example "Additional Random Access NALUs" (or SyncSampleConfigurationBox) may be defined as follows:

Box Type: 'aran' (or any other reserved four-character code not already in use)

Container: SampleTableBox

Mandatory: No

Quantity: Zero or one (per file or per track fragment)

The syntax is as follows:

```
aligned(8) class AdditionalRandomAccessNALUBox
    extends FullBox('aran', version, flags) {
    unsigned int(32)    entry_count;
    for (int i=0; i < entry_count; i++) {
        unsigned int(32)    sample_number;
        unsigned int(8) numArrays;
        for (j=0; j < numArrays; j++) {
            unsigned int(8) NAL_unit_type;
            unsigned int(8) numNalus;
            for (i=0; i< numNalus; i++) {
                unsigned int(16) nalUnitLength;
                bit(8*nalUnitLength) nalUnit;
            }
        }
    }
}
```

The 'aran' box may not be present when every sample in the video bit-stream is a sync sample.

Using this variant, a sync sample for the VVC File Format may be described as follows:

For each sync sample in a VVC track, all APSs needed for decoding of the corresponding video elementary stream from that decoding time forward are in that VVC track sample or succeeding VVC track samples. These APS needed for decoding may have explicit signalling or may be provided in a dedicated structure like the 'aran' box. Moreover, for signalling of various types of random access points in a VVC track, the following is recommended:

The 'aran' table (and the equivalent flag in movie fragments) must be used in a VVC track unless all samples are sync samples. Note that track fragment random access box refers to the presence of signalled sync samples in a movie fragment.

Generic Extension for SyncSampleBox

In a particular embodiment, the SyncSampleBox is extended with additional fields directly providing, for all or for a subset of sync samples declared in the SyncSampleBox, the additional data (e.g. non-VCL NAL units) required for random access, as a payload with its length. The SyncSampleBox is then updated as follows, using for example a new version (e.g. with the value 1) of the box. Alternatively, this extension may be signaled by using a specific value of the flags parameter (not shown below):

```
aligned(8) class SyncSampleBox
    extends FullBox('stss', version, flags=0) {
    unsigned int(32)   entry_count;
    int i;
    for (i=0; i < entry_count; i++) {
        unsigned int(32)   sample_number;
        if (version ==1) {
            unsigned int(16) length;
            unsigned int(8) inline_data[length];
        }
    }
}
``` where length is the number of bytes that correspond to the inline data following this field. The value of length must be greater than zero (the value of length equal to 0 is reserved); and inline_data corresponds to the additional data (e.g. the additional non-VCL NAL units in case of VVC bit-stream) required for random access. A player seeking or starting playout from a given sync sample in the SyncSampleBox has to append the provided inline_data to the bitstream, for example at the start of the NAL units of this given sync sample.

It is noted that during the encapsulation time, when setting a sync sample (e.g. step 315 in FIG. 3), the encapsulation module may append, for a NAL unit-based video compression scheme, as inline_data in the new version of the SyncSampleBox, the identified non-VCL NAL units required for random access, each prefixed by its length, so that inline_data can be directly pasted within a NAL unit sample. According to this embodiment, for signaling of various types of random access points, the new version of the sync sample table should be used in a VVC track unless all samples are sync samples.

Alternative to the Generic Extension for SyncSampleBox

An alternative to the extension of the SyncSampleBox may be to extend the SampleDependencyTypeBox 'sdtp' in a similar way as the SyncSampleBox is extended in the previous variant: extend it in a new version directly providing additional data from which a sample may depend on as inline_data with its length. An extension may also consist in using the reserved value 3 in the sample_depends_on parameter to indicate that the sample does not depend on others pictures but depends on more general information like coding configurations or parameter sets. The presence of the inline_data may be conditioned to the fact that the sample_depends_on parameter is set to this value 3. As for the SyncSampleBox extension, the inline_data may directly provide the additional data to be used for random access onto a given random access or sync sample.

```
aligned(8) class SampleDependencyTypeBox
    extends FullBox('sdtp', version, 0) {
    for (i=0; i < sample_count; i++){
        unsigned int(2) is_leading;
        unsigned int(2) sample_depends_on;
        unsigned int(2) sample_is_depended_on;
        unsigned int(2) sample_has_redundancy;
        if (version >0) {
            if (sample_depends_on == 3) {
                unsigned int(16) length;
                unsigned int(8) inline_data[length];
            }
        }
    }
}
```

Live Stream or Fragmented File: Specific ('Aran') Box

When encoding and packaging live streams, encapsulating the file into movie fragments is convenient to reduce latency. Using movie fragments reduces the set of encapsulation tools and ISOBMFF boxes, especially for the sample description. One possibility for fragmented files is to use the 'aran' box as defined above within a 'traf' box. The variants on arrays for APS NAL units only or for all non-VCL NAL units also combined with past-only or past plus current apply here.

A variant of the use of 'aran' box within a 'traf' box consists, for track fragments, in assuming that only the first sample of the fragment is a sync sample (e.g. when the first-sample-flags-present is set in the TrackFragmentHeader box), Box Type: 'aran' (or any other reserved four-character code not already in use)
Container: SampleTableBox or TrackFragmentBox
Mandatory: No
Quantity: Zero or one (per file or per track fragment)

```
aligned(8) class AdditionalRandomAccessNALUBox
    extends FullBox('aran', version, flags) {
    unsigned int(8) numArrays;
    for (int j=0; j < numArrays; j++) {
        unsigned int(8) NAL_unit_type;
        unsigned int(8) numNalus;
        for (int i=0; i< numNalus; i++) {
            unsigned int(16) nalUnitLength;
            bit(8*nalUnitLength) nalUnit;
        }
    }
}
```

This variant avoids the presence of the sample_number parameter, relying for example, on the first-sample-flags-present flags of the TrackHeaderBox.

Alternatively, a different name may be used for this box (to distinguish it from an 'aran' box that would only be used in SampleTableBox). Alternatively, a specific value for the flags parameter of the box may be used in which this specific value for flags controls the absence/presence of the sample_number parameter. For example, the value 0x000001 denoted first_sample_only_present indicates that only one contiguous set of additional NAL units is described within the box and this set of additional NAL units applies to the first sample of a run of samples. When this flags value is not set, then there may be several additional NAL units for some samples in a run of samples.

```
aligned(8) class AdditionalRandomAccessNALUBox
    extends FullBox('aran', version, flags) {
    extends FullBox('aran', version, flags) {
    if (flags & 0x000001 == 1) { // for first sample
        for(j=0; j < numArrays; j++) {
            unsigned int(8) NAL_unit_type;
            unsigned int(8) numNalus;
            for (i=0; i< numNalus; i++) {
                unsigned int(16) nalUnitLength;
                bit(8*nalUnitLength) nalUnit;
            }
        }
    } else { для some given samples
        unsigned int(32)    entry_count;
        for (int i=0; i < entry_count; i++) {
            unsigned int(32)    sample_number;
            unsigned int(8) numArrays;
            for(j=0; j < numArrays; j++) {
                unsigned int(8) NAL_unit_type;
                unsigned int(8) numNalus;
                for (i=0; i< numNalus; i++) {
                    unsigned int(16) nalUnitLength;
                    bit(8*nalUnitLength) nalUnit;
                }
            }
        }
    }
}
```

The box may be further controlled by using a flag value indicating whether a single NAL unit type is present or not, for example using the flags value 0x000002. When this value is set, the box does not contain the loop on arrays because it means there is only one NAL unit type present. Only the loop on numNalus may remain. The NAL unit type is provided as a first parameter of the box.

```
aligned(8) class AdditionalRandomAccessNALUBox
    extends FullBox('aran', version, flags) {
    if (flags & 0x000001 == 1) { // for first sample
        if (flags & 0x000002 == 1) { // only one NALU type
            unsigned int(8) NAL_unit_type;
            unsigned int(8) numNalus;
            for (i=0; i< numNalus; i++) {
                unsigned int(16) nalUnitLength;
                bit(8*nalUnitLength) nalUnit;
            }
        } else { // Several NALU types
            unsigned int(8) num Arrays;
            for (j=0; j < numArrays; j++) {
                unsigned int(8) NAL_unit_type;
                unsigned int(8) numNalus;
                for (i=0; i< numNalus;!++) {
                    unsigned int(16) nalUnitLength;
                    bit(8*nalUnitLength) nalUnit;
                }
            }
        }
    } else { for some given samples
        unsigned int(32)    entry_count;
        for (int i=0; i < entry_count; i++) {
            unsigned int(32)    sample_number;
            if (flags & 0x000002 == 1) { // only one NALU type
                numArrays = 1;
            } else {
                unsigned int(8) numArrays;
                for(j=0; j < numArrays; j++) {
                    unsigned int(8) NAL_unit_type;
                    unsigned int(8) numNalus;
                    for (i=0; i< numNalus; i++) {
```

```
            unsigned int(16) na/UnitLength;
            bit(8*nalUnitLength) nalUnit;
        }
      }
    }
  }
}
```

The variants on arrays for APS NAL units only or for all non-VCL NAL units also combined with past-only or past plus current, as described herein before, apply here.

In another variant, the additional non-VCL NAL units only required for random access are provided as a set of bits with their length as shown below, without indication of NAL unit-based data. The box may then be renamed as AdditionalRandomAccessInformationBox, because it is no more NAL unit specific. However, given the type of a track where this box and additional data are used, the encapsulation module takes care of providing data so that they can be merged at parsing time within a sample data without breaking the samples. For example, in case of NALU samples and of additional NAL units from a VVC bit-stream provided as inline_data, the concatenated inline_data must be a concatenation of NALU length followed by the additional NAL unit itself (header and payload). The length parameter indicates the number of bytes for all these concatenated additional NAL units required for random access. A parser, while de-encapsulating a movie fragment, when it encounters such box, during normal playout of the movie fragment, may ignore these inline_data. When seeking to this fragment or starting playout from this fragment, a parser prepends (e.g. step 655 in FIG. 6*b*) the inline data in the NALU sample corresponding to the first sample of the movie fragment.

Box Type: 'arai' (or any other reserved four-character code not already in use)
Container: TrackFragmentBox
Mandatory: No
Quantity: Zero or one

```
aligned(8) class AdditionalRandomAccessInformationBox
    extends FullBox('aran', version=0, flags=0) {
        unsigned int(16) length;
        unsigned int(8) inline_data[length];
}
```

Encapsulating Additional Non-VCL NALUs for Random Access within a Data Part of a File Several alternatives are described for these embodiments according to which the additional NAL units that are required for random access are stored in the data part of the encapsulated file. These additional NAL units may be stored as a contiguous set of NAL units at the beginning of a sample. They may also be stored as a contiguous set of NAL units after one or more non-VCL NAL units of a sample. They may also be stored as non-contiguous NAL units within a sample, preferably before the first VCL NAL unit. In any case, the encapsulation module takes care of NAL unit order specified by the video codec specification so that the extracted bit-stream by any ISOBMFF and ISO/IEC 14496-15 compliant parser leads to a conforming bit-stream.

Specific NALU Type

In one embodiment, the structure to append the additional non-VCL NAL units required only for random access is a specific NAL unit. It is identified with a reserved NAL unit type value that is not used by the video codec specification. For example, when using VVC, a NAL unit type value in the range of unspecified non-VCL NAL unit types may be used. This particular NAL unit type, when set by an encapsulation module, warns a parser that this is a specific NAL unit. According to this embodiment, this NAL unit is dedicated to contain an additional NALU that is present in a sample only for random access onto or for seeking to this sample. A parser may decide to skip this specific NAL unit during normal playout. This specific NAL unit is special because the NAL unit type indicates that this is a NAL unit container. This NAL unit simply packages the whole original NAL unit into an optional NAL unit, that can be skipped or appended depending on the usage, here random access NAL unit.

The NAL unit header follows the syntax from VVC specification. The nal_unit_type is a reserved one. The NAL unit payload simply consists in the whole original NAL unit (header+payload). Then, when a parser decides to process such specific NAL unit, it first removes the NAL unit header with the specific NAL unit type and then process the original NAL unit, for example an APS NAL unit required for random access. The NAL unit length preceding this specific NAL unit consists in the total length of the specific NAL unit (i.e. the length of its NAL unit header plus the length of the whole original NAL unit). This specific NAL unit type should not go into a video bit-stream. This means that when ignored or skipped, it must be removed by a parser before feeding the NAL units of the sample to a video decoder. When processed, the NAL unit header with specific NAL unit header must be removed and only the whole original NAL unit must be passed to the video decoder.

Specific Aggregated NALU

Figure 9:
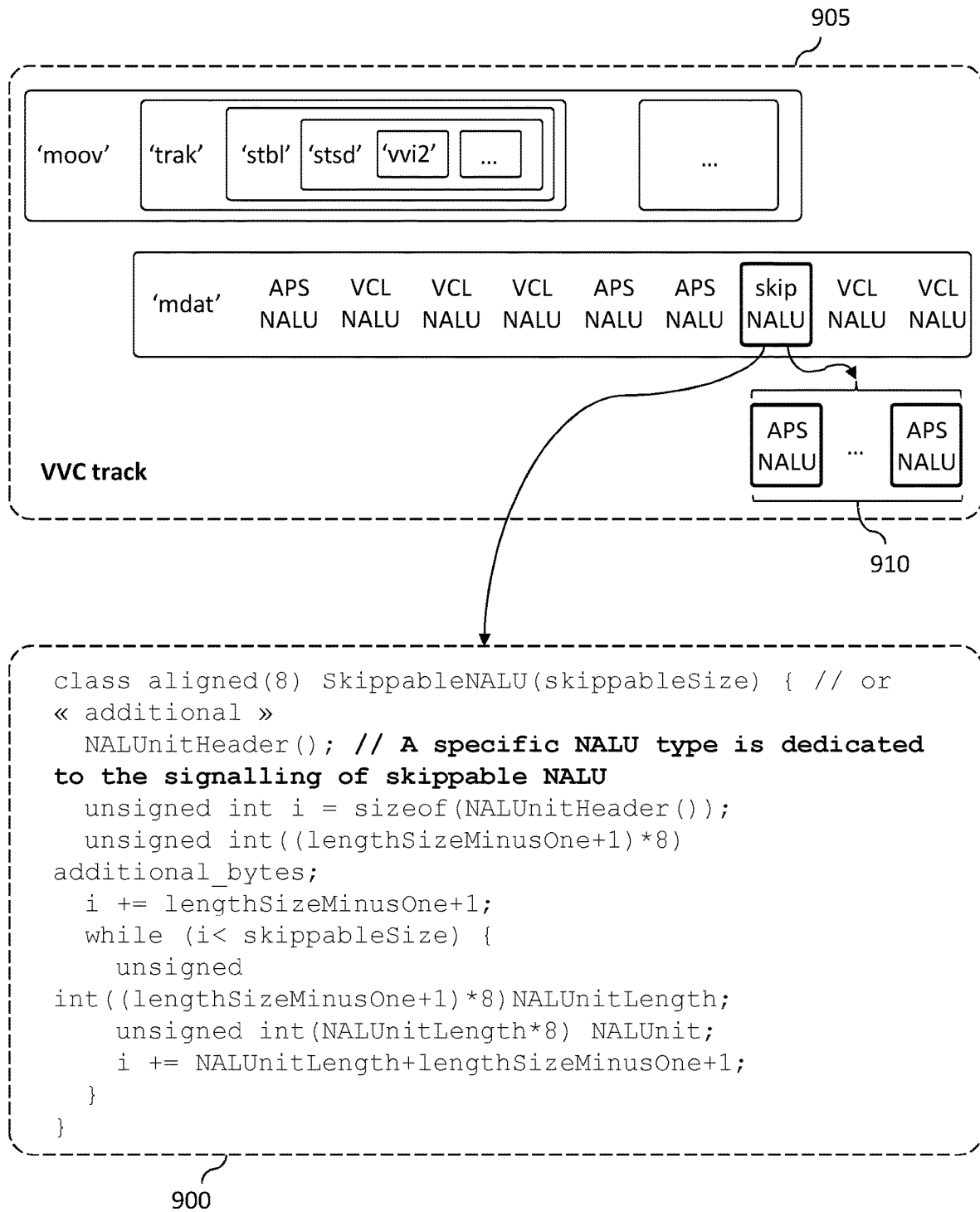
FIG. 9 illustrates an example of a specific NALU-like structure in a data part of a VVC track aggregating additional non-VCL NAL units required only for random access.

FIG. 9 illustrates an example of a specific NALU-like structure 900 in the data part of a VVC track 905, aggregating the additional non-VCL NAL units required only for random access 910. This track has a specific sample entry type (e.g. 'vvi2' or 'vvcr') indicating that it is self-contained and suitable for random access because it contains and allows identification of the additional non-VCL NAL units required for random access. In a particular embodiment, the additional non-VCL NAL units required only for random access are stored as NAL units in a specific structure in the data part of the file. A specific NAL unit type, not used by the video codec specification is used for declaring, at encapsulation time, and identifying, at parsing time, a set of optional set of NAL units, that can be skipped or appended, that are required only for seeking or random access operation into the media file. An example of such a specific NAL unit structure is described in FIG. 9 with reference 900.

According to the illustrated example, a first parameter, skippableSize, provides the size of the skippable NAL unit. In addition to this parameter, the structure contains a NAL unit header, compliant with the video codec specification in use, except for the NAL unit type that is a specific value, not in use in the video codec specification. This header is followed by the NAL unit payload consisting in a parameter that provides the number of bytes following this aggregation that should be considered as skippable in case this specific NAL unit is referenced by an extractor with data_length equal to zero. Additionally, there is a loop on the aggregated additional NAL units within the structure until the size of the whole structure is reached.

This specific NAL unit type should not go into a video bit-stream. This means that when ignored or skipped, it must be completely removed by a parser before feeding the NAL units of the sample to a video decoder. When processed, the NAL unit header with specific NAL unit header must be removed and only the aggregated NAL units must be passed to the video decoder.

Including Additional NALUs Required for Random Access by Reference

Figure 10:
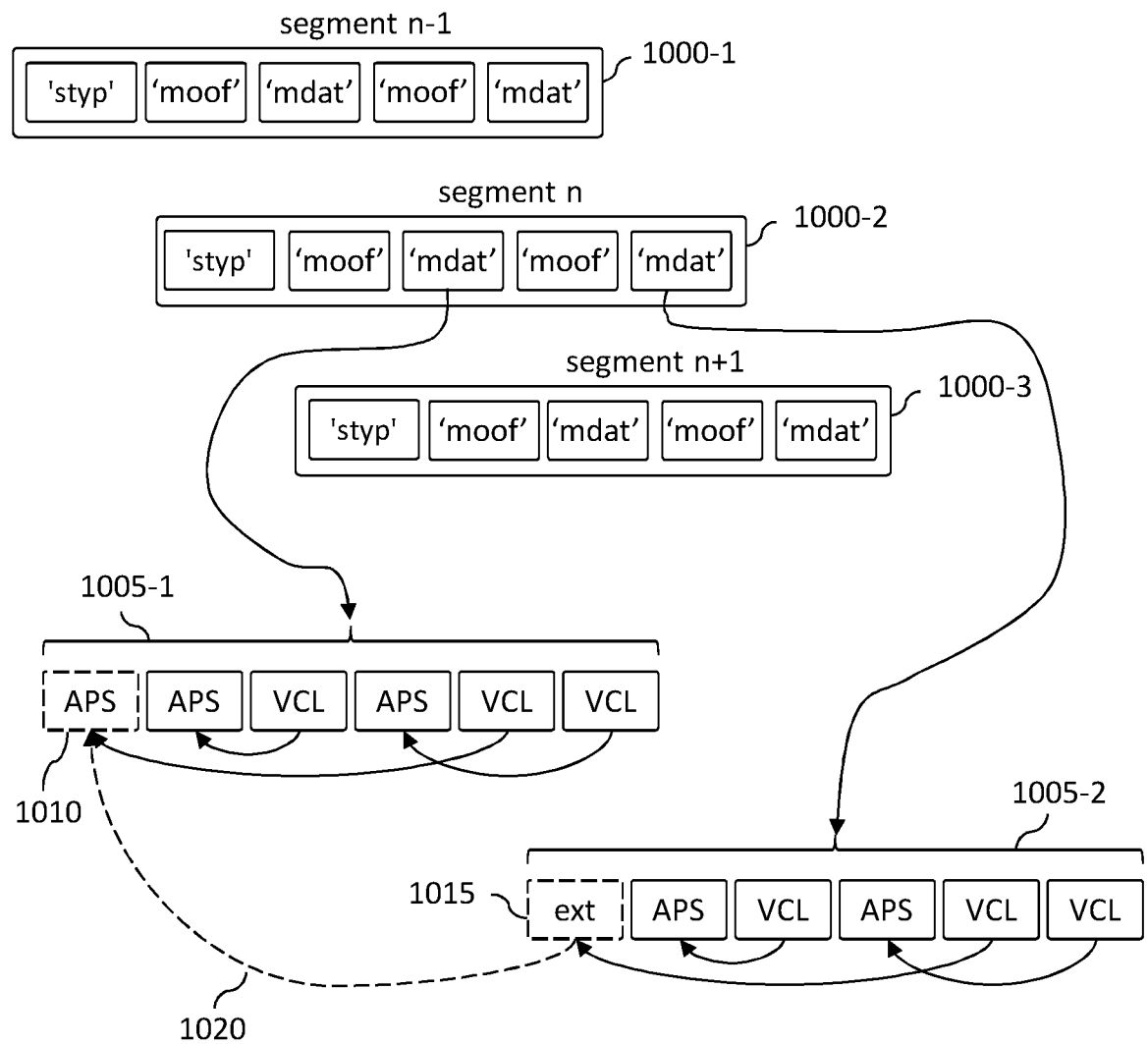
FIG. 10 illustrates an example of encapsulation of a video bit-stream into media segments containing several media fragments.

FIG. 10 illustrates an example of encapsulation of a video bit-stream into media segments, for example into media segments 1000-1 to 1000-3, containing several media fragments, in particular media fragments 1005-1 and 1005-2.

The encapsulation module, for example encapsulation module 205 in FIG. 2, may provide one or more additional non-VCL NAL units, for example the additional non-VCL NAL unit 1010, that are required for random access, only for the first sample of the segment. For other random access points in the segment, for example the first sample of a fragment 1005-2 within the segment 1000-2, one or more references to the additional NAL units required for random access are included as one or more specific NAL units, instead of being duplicated For example, reference 1020 to the additional NAL unit 1010 is included as specific NAL unit 1015 in the second fragment 1005-2 of the segment 1000-2. The specific NAL unit 1015 may consist in a simple copy or in a rewriting instruction of the referenced NAL unit 1010.

Such a specific NAL unit may be an Extractor NAL unit. It has a specific NAL unit type that does not conflict with the other types of NAL units in the video codec specification. It may simply consist in a copy of one or more NAL units or it may be composed of an inline constructor plus one sample constructor. Using an inline constructor plus a sample constructor may be useful if a modification of the referenced NAL units is required when copying those to the sample. For example, editing the NAL unit type of a referenced NAL unit (e.g. changing a suffix APS into a prefix). For the sake of illustration, specific NAL unit 1015 may be a new Extractor, for example signalled with a specific type of NAL unit that is different from a classical Extractor to further indicates, in addition to the extraction operation, that it may be skipped. This means that it should be resolved by players or parsers only for a given playout mode, for example on seeking or on random access to a sync sample. In normal playout, it may be skipped or ignored by a parser. In any case, this specific NAL unit should not appear in the video bit-stream. It must be ignored and then removed from the bit-stream or resolved by applying the copy or extraction operations into NAL units compliant with the video codec specification. Either the Extractor NAL unit type indicates that it is a skippable or optional or additional Extractor to be processed for random access or, it may be a classical Extractor but with a specific constructor type indicating that it is an optional or additional constructor to be applied only for random access. To signal this, a non-used constructor type value is reserved for the signalling of such constructor.

For example, the Extractor structure may be updated as follows:

```
class aligned(8) Extractor ( ) {
    NALUnitHeader( );
    do {
        unsigned int(8)    constructor_type;
        if( constructor_type == 0 )
            SampleConstructor( );
        else if( constructor_type == 2 )
            InlineConstructor( );
        else if( constructor_type == 3 )
            SampleConstructorFromTrackGroup( );
        else if( constructor_type == 4 )
```

-continued

```
            ReferenceConstructor( );
        else if( constructor_type == 5 )
            DefaultReferenceConstructor( );
        else if( constructor_type == 6 )
            NALUStartInlineConstructor( );
        else if (constructor_type == 7 )
            OptionalConstructor( );
    } while( !EndOfNALUnit( ) )
)
``` where the optionalConstructor may have the same parameters as a SampleConstructor except that it is optional to process.

In a variant, the optional constructor has simplified description. For example, assuming that it extracts non-VCL NAL units from the current track containing the Extractor NAL unit, the track_ref_index parameter is not indicated. The sample offset is present, for example referencing a previous sync sample in a movie fragment or in a segment. The data_offset and data_length parameters are also present to indicate which byte range to copy, for example from a previous sync sample.

In another variant the optional constructor may be a constructor with a copy mode set to the value 1 to copy full NAL units or to the value 2 to copy only the NAL unit payload in case the NAL unit header needs to be rewritten (for example to change NAL unit types from SUFFIX_APS to a PREFIX_APS or from a SUFFIX_SEI to a PREFIX_SEI).

Encapsulating Additional Non-VCL NALUs for Random Access within Both a Metadata and a Data Part of a File Extended SyncSampleBox to Refer Additional NALUs In a particular embodiment, a description of the additional non-VCL NAL units required for random access is provided in the metadata part of the file, while these NAL units are stored in the media data part. The description may be provided in an extension of the SyncSampleBox. The SyncSampleBox still contains the list of indexes for samples that are sync samples. While the list of sample indexes is generic (agnostic to the video compression format), the extension proposed for the SyncSampleBox is specific to the video compression format. The SyncSampleBox then rewrites into (extensions or new parameters appear in bold):

```
aligned(8) class SyncSampleBox extends FullBox('stss', version, 0) {
    unsigned int(32)   entry_count;
    int i;
    for (i=0; i < entry_count; i++) {
        unsigned int(32)   sample_number;
        if (version > 0) {
            unsigned int (32) codec_specific_parameters;
        }
    }
}
``` where the codec_specific_parameters is defined for VVC as a parameter called, for example, required_nalu_info, or as a combination of this required_nalu_info parameter with a reserved_bits parameter for extensibility. The parameter required_nalu_info (or any other name) is a parameter providing means to identify, within a given sync sample (corresponding to the sample_number-th sample), the NAL units that are required only for random access. It consists in a 1-based index indicating in the list of NAL units for a given sync sample those that are required only for random access. It may be coded on the same number of bits as the number of bits used for codec_specific_parameters, or when combined with reserved_bits, on a total number of bits for both parameters that should be equal to the number of bits used for the codec_specific_parameters. The required_nalu_info information is set by the encapsulation module when copying the additional non-VCL NAL units required for random access (e.g. step 320 in FIG. 3 or step 440 in FIG. 4). It is useful for a player or a reader to skip these NAL units during normal playout mode (e.g. step 655 in FIG. 6*b*).

In a variant, the codec_specific_parameters parameter consists in a list of indexes of additional NAL units required only for random access, still described in the extended SyncSampleBox but defined here as an offset (or start_offset) and a length, expressed in number of NAL units. The offset is a 1-based index indicating the index of the first NAL unit required only for random access and the length provides the number of additional NAL units. This variant is suitable when all the additional NAL units required only for random access are contiguous and is defined as follows:

unsigned int (8) ra_nalu_start_offset;

unsigned int (8) ra_nalu_length;

unsigned int (16) reserved_bits;

In this example, the offset and length for the indexes of the additional NAL units required only for random access is coded on 8 bits each (letting possibility for other information in the codec_specific_parameters). This is because usually the non-VCL NAL units are placed before the VCL ones in the NALU sample and there are not so many additional NAL units required for random access. In case of video compression format or profile or level or complex bitstream requiring more additional NAL units than 256, of course, the length field (ra_nalu_length) or the offset (ra_nalu_start_offset) field may be coded onto 16 bits (or any combination of number of bits between offset, length and reserved bits (set to 0) that is no greater than 32 bits or no greater than the number of bits in use for codec_specific_parameters).

Extended SampleDependencyTypeBox 'Sdtp' to Refer Additional NALUs

An alternative to the extension of the SyncSampleBox may be to extend the SampleDependencyTypeBox 'sdtp' in a similar way as the SyncSampleBox is extended in the previous variant: extend it with a codec_specific_parameter providing more information, for example on the dependent samples. An extension may also consist in using the reserved value 3 in the sample_depends_on parameter to indicate that the sample does not depend on others pictures but depends on more general information like coding configurations or parameter sets. The presence of the codec_specific_parameters may be conditioned to the fact that the sample_depends_on parameter is set to this value 3. As for the SyncSampleBox extension, the codec_specific_parameters may provide an indication on the additional non-VCL NAL units that are required only for random access.

```
aligned(8) class SampleDependencyTypeBox
    extends FullBox('sdtp', version, 0) {
    for (i=0; i < sample_count; i++){
        unsigned int(2) is_leading;
        unsigned int(2) sample_depends_on;
        unsigned int(2) sample_is_depended_on;
        unsigned int(2) sample_has_redundancy;
        if (version > 0) {
            if (sample_depends_on == 3) {
                unsigned int (32) codec_specific_parameters;
```

-continued

```
            }
        }
    }
}
``` where codec_specific_parameters has the same semantics as in the extended SyncSampleBox.

Use SubSampleInformation Box

ISOBMFF provides a box for the description of subsample information (subs) in an encapsulated file or even in an encapsulated fragmented file (i.e. an ISOBMFF file containing movie fragments). A subsample, or sub-sample, is a contiguous range of bytes of a sample. Depending on the flag value of the SubSampleInformationBox and depending on the video codec format, the subsample can be based on a NAL unit basis, a slice basis, or a tile basis, etc.

To indicate which NAL units within a sample correspond to additional NAL units only required for random access, the subsample information box may be used as follows:

the parameter entry_count is set to the number of sync samples when the 'subs' box is only used to describe additional NAL units required for random access.

the sample_delta parameter indicates the distance in samples between two sync samples, or between two samples for which information at subsample level is available.

the semantics for the subsample_count and subsample_size parameters is unchanged.

For example, the subsample_count may correspond to the number of additional NAL units required for random access for a given sample. When the additional NAL units are copied in the data by the encapsulation module as a contiguous byte range at the beginning of a sample, the subsample_count may be set to 1. When the additional NAL units are copied in the data by the encapsulation module as a contiguous byte range within a sample, subsample_count may be set to at least two: the first range corresponding to the range of NAL units preceding the contiguous range of additional NAL units (described as the second subsample). When the additional NAL units are not copied into the data as one contiguous byte range, the value of subsample_count may be set at least equal to the number of ranges corresponding to additional NAL units only required for random access plus the number of ranges corresponding to regular (always required or from the original PU in the bit-stream corresponding to the current sample) NAL units that is placed within two ranges of additional NALUs.

the subsample_priority is set to a low value for a subsample corresponding to additional NAL units required only for random access, indicating that the subsample is not highest priority for the normal playout, because required only for random access or seeking operation. As such, the discardable flag is set to true, meaning that it is not required to decode the current sample (at least for normal playout).

the codec_specific_parameters may be set as follows: the flags value of the 'subs' box may be set to 0 to indicate NAL-unit based subsamples. The 32 bits dedicated to the codec_specific_parameters may then be used as follows: the bits already used for VVC subsample description are kept untouched and some reserved bits are used for the specific signaling of additional NAL units required only for random access.

The codec_specific_parameters field may be defined as follows:

```
if (flags == 0) { // NAL-unit based subsample
    unsigned int(1) VclNalUnitFlag;
    unsigned int(1) RapNalUnitFlag;
    unsigned int(1) GraNalUnitFlag;
    bit(28) reserved = 0;
    unsigned int(1) RaAdditionalNalUnitFlag;
else (... unchanged ...)
``` where RaAdditionalNalUnitFlag equal to 0 indicates that all NAL units in the sub-sample are non-VCL NAL units that are required for normal playout. Value 1 indicates that all NAL units in the sub-sample are non-VCL NAL units that are only required for random access and that may be ignored or skipped during normal playout of the related video track.

From this codec_specific_parameters, players can rapidly check whether to further inspect the subsample information or not. For example, when discardable is set to true and codec_specific_parameters has the value 1, this indicates that the subsample may be skipped by a parser (e.g. step 655 in FIG. 6b), because it corresponds to additional non-VCL NALUs only required for random access. This may be further confirmed by a sample entry type indicating a track containing additional non-VCL NAL units that are only required for random access (e.g. 'vvi1' or 'vvi2' or 'vvcr'). As another example, when the codec_specific_parameters has the value 0, the subsample corresponds to non-VCL NAL units that may be required for decoding.

The use of SubSampleInformation box may be useful when the encapsulation module, encapsulation module 205 in FIG. 2, copies an additional non-VCL NAL units required for random access not necessarily within a sync sample but in a sample that is the first to use this additional non-VCL NAL unit. Then, the number of entries in the 'subs' box may be greater than the number of sync samples, also considering samples located between two sync samples. Such copying may lead to smoother bitrate in a group of images, avoiding a peak rate on the sync sample for the IRAP.

The extended use of SubSampleInformation box would apply as well in the compact version of the SubSampleInformation Box (e.g. 'subs' box with version=2).

Use SubSampleInformation Box for Roll Instructions

The SubSampleInformationBox may be used to indicate how to perform random access in VVC tracks with mixed nal unit types, as depicted in FIG. 8a or 8b. The recovery or roll information is provided at the subsample level. Such a recovery item of information may indicate where to find a previous or a future sync sample for a given subsample (e.g. a subpicture). It can be stored, for example, as a new value of the flags parameter of the box. For the sake of illustration, the value 6 (or any reserved value dedicated to this purpose and not conflicting with an existing value) may be used. When this value is used, the semantics of the codec_specific_parameters parameter may be extended as follows (other flags value are unchanged):

```
} else if (flags == 6) {
    signed int(16) sync_distance;
    unsigned int(16) reserved = 0;
}
``` where sync_distance indicates the distance of the subsample to next or previous decodable subsample (e.g. a subpicture) in a roll access. For the sake of illustration, a value equal to 0 indicates that the subsample contains NAL units to be processed during the roll, a positive value indicates the distance in sample count to the next sample containing the first NAL units required for the roll access for the desired subsample, and a negative value indicates the distance in sample count to the previous sample containing the first NAL units required for the desired subsample. The sync_distance must be at most (in absolute value) the roll_distance indicated in an associated 'roll' sample group description when present. This is suitable for VVC tracks with mixed nal unit types, like for example a VVC track containing at least two subpictures, for example VVC track 800 illustrated in FIG. 8a or in FIG. 8b. While allowing granular description of the samples, using 'subs' box may be costly in terms of description, because a description of all NAL units is repeated for each sample. Moreover, this recovery information tends to repeat across group of pictures because the IRAP distance, or refresh period, for a given subpicture, may be constant. So, most of the time, only the initial delay between the IRAP subpictures may be useful. Using a nal unit mapping may be more appropriate especially when the samples have similar NAL unit patterns from one to another.

For example, when considering VVC track 800 in FIG. 8a, the encapsulation module may generate the following description within the subs box: SubsampleInfo identified by its 4cc 'subs', with a flags value equal to 6 and a number of subsample_count equal to the number of subpictures.

The sync sample for subpicture 1 (e.g. sample 805-1, 805-5, or 805-9), generically referenced sample N, may have two entries that may be identified with their respective sync-distance to the next or previous IRAP subpicture in the codec_specific_parameters field, as follows:

```
{
    sync_distance=0 // forNAL units from subpicture 1
    sync_distance=3 // for NAL units from subpicture 2
}
```

Likewise, the following sample (e.g. sample 805-2, 805-6, or 805-10), generically referenced sample N+1, may be described as follows:

```
{
    sync_distance=-1 // for NAL units from subpicture 1
    sync_distance=2 // for NAL units from subpicture 2
}
```

Similarly, the next two samples, i.e. samples N+2 and N+3, may be described in the codec_specific_parameters field of the subs box as follows:

```
{(Sample N+2)
    sync_distance=-2 , // for NAL units from subpicture 1
    sync_distance=1, // for NAL units from subpicture 2
}
{(Sample N+3)
    sync_distance=-3 , // for NAL units from subpicture 1
    sync_distance=0 // for NAL units from subpicture 2
}
```

It is noted that the description of sample N+4 and of the following samples may be the same as the one of sample N and of the following samples because of the refresh periods for each subpicture that are static over time. Nevertheless, these descriptions may be provided in the subs box for sample N+4 and the following samples.

A variant using the SubSampleInformationBox to provide sync_distance consists in reusing an existing kind of sub-samples corresponding to NAL unit range, indicated by the flags value of the subs box set to 0. However, using a dedicated type value allows parsers to rapidly check the nature of the subsample description, rather than exploring subsample entries (the codec_specific_parameters).

The codec_specific_parameters may be redefined as follows (using some reserved bits from the current definition in ISO/IEC 14496-15 Amd on carriage of VVC in ISOBMFF:

```
if (flags == 0) {
   unsigned int(1) RapNalUnitFlag;
   unsigned int(1) GraNalUnitFlag;
   unsigned int(1) VclNalUnitFlag;
   bit(16) sync_distance = 0;
   bit(13) reserved = 0;
   else if (flags == 1){ . . . other kinds of subsamples
``` where the semantics of RapNalUnitFlag, GraNalUnitFlag and VclNalUnitFlag are unchanged from ISO/IEC 14496-15 and where sync_distance follows the same semantics as in the previous variant using the other flags value, set to 6 (for example). It is to be noted that the variant using 'subs' box to provide a sync_distance, when sync_distance=0, may be combined with the variant of 'subs' box indicating the RaAdditionalNalUnitFlag. This latter flag may be signaled using one bit in the reserved bits to indicate a range of (non-VCL) NAL unit providing, for example parameter sets required for random access. When combined, there would be one or more additional entries in the subs box, one per non-VCL NALU range indicating additional NAL units required for random access.

Use Flags from Movie Fragments Boxes

The ISOBMFF tools for movie fragment description provides means to indicate, on a sample basis, whether a given sample has dependency or not and whether it is a sync sample or not. For example, the track fragment header box or the TrackExtendsBox 'trex' or the TrackRunBox 'trun' define values in their flags parameter or in fields in their definition for this purpose. Among these boxes, none provides description at NAL unit level on some "disposable", or "skippable" or "additional" NAL units required only in some situation, like seeking or random access for example.

An embodiment to provide a self-contained single track providing random access in a fragmented file consists in extending some boxes for the movie fragment description to support NAL unit-level description of additional information, for example using some reserved bits in some flags values.

In a particular embodiment, for encapsulation of fragmented file, the sample flags is extended as follows (in bold): an additional parameter is provided in the sample flags as one bit flag (note that this additional parameter may be placed at any position in the list after the reserved bits and preferably before the last 16 bit parameter (for parsing convenience):

bit(3) reserved=0;
unsigned int(2) is_leading;
unsigned int(2) sample_depends_on
unsigned int(2) sample_is_depended_on;
unsigned int(2) sample_has_redundancy;
bit(3) sample_padding_value;
bit(1) sample_is_non_sync_sample; (replaces stss)
unsigned int (1) sample_has_additional_dependency;
unsigned int(16) sample_degradation_priority;

where the new parameter sample_has_additional_dependency indicates whether a given sample has dependency to previous samples that are not image coded data like VCL NAL unit but rather dependencies to high level information like parameter sets or bit-stream configuration, like for example non-VCL NAL units. In a variant, using another bit from the bits available in the reserved parameters, the sample flags contain another parameter, for example sample_contains_dependency_data, that indicates whether these additional dependencies are provided within the sample or should be found by parsing other information from the sample or track description (for example track reference to a non-VCL track).

bit(2) reserved=0;
unsigned int(2) is_leading;
unsigned int(2) sample_depends_on
unsigned int(2) sample_is_depended_on;
unsigned int(2) sample_has_redundancy;
bit(3) sample_padding_value;
bit(1) sample_is_non_sync_sample;
unsigned int (1) sample_has_additional_dependency;
unsigned int (1) sample_contains_dependency_data;
unsigned int(16) sample_degradation_priority;

This additional parameter may be useful to handle random access for both single track and multi-track encapsulated files.

The use of these two additional parameters, combined with the sample_is_non_sync_sample parameter, allows description of the following configurations:

- a single track contains random access or sync samples having dependencies to non-VCL NAL units in previous samples and these non-VCL NAL units are available in the data for this sample. This is indicated by setting the following values: sample_is_non_sync_sample=0; sample_has_additional_dependency=1 and sample_contains_dependency_data=1.
- a single track or video track in a multi-track encapsulation contains random access or sync samples having dependencies to non-VCL NAL units in previous samples but these non-VCL NAL units are not available in the data for this sample. This is indicated by setting the following values: sample_is_non_sync_sample=0, sample_has_additional_dependency=1, and sample_contains_dependency_data=0.
- a single track or video track in a multi-track encapsulation contains samples that are not necessarily sync or random access samples having dependencies to non-VCL NAL units in previous samples before the last sync sample but these non-VCL NAL units are not available in the data for this sample. This is indicated by setting the following values: sample_is_non_sync_sample=1, sample_has_additional_dependency=1, and sample_contains_dependency_data=0.
- a single track encapsulation contains samples that are not necessarily sync or random access samples having dependencies to non-VCL NAL units in previous samples before the last sync sample and these non-VCL NAL units are available in the data for this sample. This is indicated by setting the following values: sample_is_non_sync_sample=1, sample_has_additional_dependency=1, and sample_contains_dependency_data=1.
- a single track or video track in a multi-track encapsulation contains samples that are not necessarily sync or random access samples that have no dependencies to non-VCL NAL units in previous samples before the last sync sample. This is indicated by setting the following values: sample_is_non_sync_sample=1, sample_has_additional_dependency=0, and sample_contains_dependency_data=0. This configuration may be the default case. As such, the default_sample_flags, in TrackExtendsBox or in TrackFragmentHeaderBox, may be initialized to this set of values. This allows explicit of additional dependencies signaling only on the samples, for example in the 'trun' box. This 'trun' box may have its first-sample-flags-present that is not set.

the configurations with sample_has_additional_dependency=0 and sample_contains_dependency_data=1 are not allowed;

the configuration with sample_is_non_sync_sample=0, sample_has_additional_dependency=0, and sample_contains_dependency_data=0 indicates a real random access or synchronization sample having no dependencies of any kind to information from the bit-stream for previous picture units.

When the parameter sample_contains_dependency_data is set to 1, in the case of VVC bit-stream, this means that the additional non-VCL NAL units are contained within the samples. For example, APS NAL units needed for the decoding of some samples in a current movie fragment that would come from a previous movie fragment are duplicated in the current movie fragment. When the parameter sample_contains_dependency_data is set to 0, in case of self-contained track, this means that the dependency data (e.g. additional non-VCL NAL units like for example APS NAL units) are provided in some box in the metadata part. These dependency data may be provided in the 'aran' or the 'subs' box within the track fragment or directly inline in a new version of the 'trun' box. When the parameter sample_contains_dependency_data is set to 0, and the track is not a self-contained track (e.g. indicated by a specific sample entry type like 'vvi2', 'vvcr', or updated 'vvi1'). The non self-contained track may have a track reference to one or more other tracks providing non-VCL NAL units. A parser must inspect these one or more other tracks to get the appropriate non-VCL NAL units required to decode the sample.

Using (Sample Group and) NALU Mapping

ISO/IEC 14496-12 defines sample groups describing random access or synchronization samples (e.g. 'rap' or 'sync' sample groups).

Figure 11:
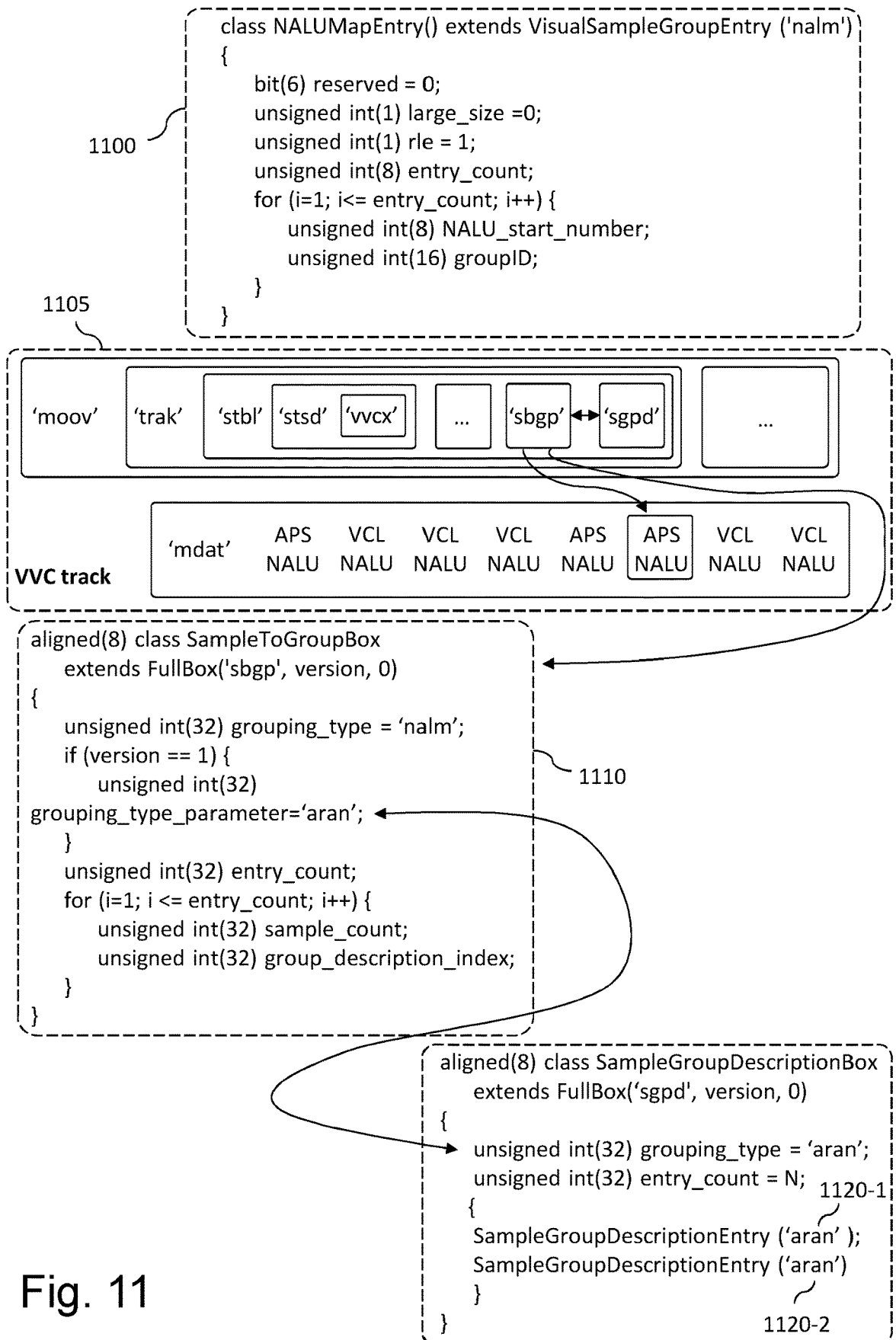
FIG. 11 illustrates an example of a mapping of additional non-VCL NAL units that may be used to indicate additional NAL units that are duplicated only for enabling random access.

FIG. 11 illustrates an example of a NAL unit mapping for indicating the additional non-VCL NAL units, denoted 1&00. This NAL unit mapping may be used to indicate additional NAL units that are duplicated only for enabling random access. All the samples may be associated to a NAL unit mapping in the sample group box 1110. Alternatively, only the sync samples may be associated with a NAL unit mapping in the sample group box 1110. The NAL unit mapping is stored in a SampleGroupDescriptionBox with grouping_type equal to 'nalm' (not represented) that contains as entries NAL unit mapping structures as 1100. The group_description_index parameter in 1110 corresponds to an entry in this SampleGroupDescriptionBox with grouping_type equal to 'nalm'. This sample grouping and NAL unit mapping may be used in fragmented files (e.g. the track fragment flags may provide an indication that some samples (e.g. only the first one) contain additional data, this sample grouping and NALU mapping may provide the indication of which NAL units within a given sample in a track fragment are actually additional, optional or skippable ones).

As illustrated, the VVC track denoted 1105 contains a 'sbgp' box 1110 of the type 'nalm' with a new grouping_type_parameter 'aran', or any four-character code reserved for describing additional random access NAL units. The NAL units mapped onto this new grouping_type_parameter is an indication for parsers that these NAL units are to be processed only for random access to or seeking in the encapsulated media file. In other words, players may ignore or skip these NAL units during normal playout. A NAL unit being mapped to groupID 0 (in 1100) by a NALUMapEntry implies that the NAL unit is required for decoding (by doing so, only the additional NAL units are mapped to a description in the SampleGroupDescriptionBox 1120). The corresponding sample group description box 1120 with grouping type set to 'aran' (or the specific four-character code used in the grouping_type_parameter of the 'nalm' sample group 1110) may provide the sample_number of the sync sample requiring these additional NAL units. The VisualSampleGroupEntry of type 'aran' 1120-1 or 1120-2 in the 'sgpd' box 1120 may have no specific parameters (only those required by parent structures), just indicating that a NAL unit mapped onto this entry in the 'sgpd' is an optional, skippable or additional NAL unit only required for random access.

By parsing this NAL unit mapping, parsers have an indication of whether a given NAL unit is to be processed or should be processed only in case of random access. Moreover, a parser may only keep the mandatory NAL units to provide a simpler bit-stream to video decoders.

Specific NALU Sample

In one embodiment, where the additional non-VCL NAL units required for random access are appended in the sample itself, the definition of the NALU sample from ISO/IEC 14496-15 is updated with an additional parameter. This new parameter allows indicating within a NALU Sample whether it contains optional, skippable or additional NAL units that may be skipped during normal playout. This parameter is illustrated in bold below:

```
aligned(8) class NALUSample{
    unsigned int PictureLength = sample_size; //Size of Sample from SampleSizeBox
(including flag below)
    unsigned int has_skippable_NALUs; // Flag indicating skippable (or additional)
NALUs or not
    for (i=0; i<PictureLength−1; )// to end of the picture{
        uint (DecoderConfigurationRecord.LengthSizeMinusOne+1)*8)NALUnitLength;
        bit(NALUnitLength*8) NALUnit;
        i += (DecoderConfigurationRecord. LengthSizeMinusOne+1) + NALUnitLength;
    }
}
```

A parser encountering such sample may process a subset of sample's NAL units, for example by checking for presence of a NAL unit mapping with grouping_type_parameter='aran' (as described hereinafter by reference to FIG. 11) or any metadata structure describing or referencing additional non-VCL NAL units only required for random access Using Segment Index Box It is to be recalled that the extension of the segment index box is under consideration in the MPEG File Format group. For example, a new version (=2) of the 'sidx' box may provide a range of bytes sufficient to download a SAP (the part in bold below).

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)             reference_type;
        unsigned int(31)    referenced_size;
        unsigned int(32)    subsegment_duration;
        bit(1)              starts_with_SAP;
        unsigned int(3)     SAP_type;
        unsigned int(28)    SAP_delta_time;
        if (version>=2) {
            if (starts_with_SAP) {
                unsigned int(32)    SAP_range;
            }
        }
    }
}
``` where SAP_range provides a range of bytes, starting from the beginning of the sub-segment, sufficient to download the SAP (if any) associated with this sub-segment.

According to a particular embodiment, the SAP_range provides the range of bytes, from the beginning of the sub-segment, sufficient to download the SAP (if any) associated with this sub-segment, this byte range including the additional NAL units required for random access. Optionally, the byte offset and length are provided in a new version of the 'sidx' box as a new ARAN_range parameter as illustrated below.

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)             reference_type;
        unsigned int(31)    referenced_size;
```

-continued

```
        unsigned int(32)    subsegment_duration;
        bit(1)              starts_with_SAP;
        unsigned int(3)     SAP_type;
        unsigned int(28)    SAP_delta_time;
        if (version>=2) {
            if (starts_with_SAP) {
                unsigned int(32)    SAP_range;
                unsigned int (16)   ARAN_offset;
                unsigned int (16)   ARAN_length;
            }
        }
    }
}
```

In a variant to the ARAN byte offset and length corresponding to the additional NALUs required for random access, the new version of the 'sidx' box rather contains a flag indicating, when set, that the SAP is a true SAP point, in the sense that the required non-VCL are also part of the sample. When this flag is not set, it indicates that the additional NAL units have to be obtained elsewhere, for example in a dedicated metadata structure as in a variant of the embodiment in which the additional non-VCL NAL units are stored within a data part of a file, or in another track providing non-VCL NALUs (e.g., referenced in the track reference box of this track).

In a variant, also under consideration by the MPEG file format group, the new version of the 'sidx' providing byte range for SAP is expressed as follows:

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)             reference_type;
        unsigned int(31)    referenced_size;
        unsigned int(32)    subsegment_duration;
        bit(1)              starts_with_SAP;
        unsigned int(3)     SAP_type;
        unsigned int(28)    SAP_delta_time;
    }
    if (flags & mask) {
        for (i=1; i <= reference_count; i++)
        {
            if ((reference_type[i] == 0) && (starts_with_SAP[i] == 1))
            {
                unsigned int(32)    SAP_end_offset;
            }
        }
    }
}
``` where SAP_end_offset provides the position of the last byte of the SAP in the current sub-segment.

As in the previous variant, the new version of the 'sidx' box is extended with a byte offset and length (or a first and last byte positions) indicating where the additional NAL units are required for random access. The new 'sidx' box then rewrites as follows:

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++)
    {
        bit (1)                 reference_type;
        unsigned int(31)        referenced_size;
        unsigned int(32)        subsegment_duration;
        bit(1)                  starts_with_SAP;
        unsigned int(3)         SAP_type;
        unsigned int(28)        SAP_delta_time;
    }
    if (flags & mask) {
        for(i=1; i <= reference_count; i++)
        {
            if ((reference_type[i] == 0) && (starts_with_SAP[i] == 1))
            {
                unsigned int(32)        SAP_end_offset;
unsigned int (16)       ARAN_offset;
                unsigned int (16)       ARAN_length;
            }
        }
    }
}
```

As another variant for this new version of the 'sidx' box, the ARAN offset and length parameters may be replaced by a flag indicating whether the SAP is self-contained (it contains the additional NALUs required for random access) or not.

Whatever the variant to indicate presence/absence or byte range for the ARAN, this may be controlled at the box level using reserved values for the flags parameter of the box. For example, a flag value has_self_contained_SAP indicates, when set, that the SAP of each sub-segment of the segment are self-contained (they all contain in their NALUs the additional NALUs required for random access). This allows use of the ISOBMFF segment indexing wherever are stored the additional NAL units required for random access.
Using a Sample Group for Recovery of APS Required for Random Access According to particular embodiments, the encapsulation module puts recovery instruction in the encapsulated media file to indicate to segmenters or parsers that some partial sync samples require some pre-processing before being delivered to a streaming client or before being parsed and provided to a video decoder. This pre-processing may consist in gathering the non-VCL NAL units that are required for random access before delivering or parsing the sample. These required non-VCL NAL units may have been buffered by the encapsulation module, for example as described with reference to step 310 or 430 in FIG. 3 or 4, respectively.

It is recalled that ISOBMFF specifies recovery mechanism, like the 'roll' sample group documenting the recovery points for random accesses. This recovery process may also be called "roll" process. For video tracks, the VisualRollRecoveryEntry gives the number of samples (with previous of future decoding time) that need to be processed in order for a sample to be decoded correctly. For example, in a video bit-stream, an encoder might encode intra-coded macroblocks in the stream, such that it knows that within a certain period of time, the entire picture only comprises pixels that value only depends on intra-coded macroblocks supplied during that period. The classical roll_distance in the existing 'roll' sample group may differ from a recovery instruction providing non-VCL NAL units required for random access in the sense that it simply informs players on a duration of possible bad quality of reconstructed picture.

According to this embodiment, the encapsulation process that reflects encoder choices in terms of types of pictures, may not indicate operations performed by an encapsulation module, like duplication of non-VCL NAL units for random access purpose, but instead may provide instructions for parser or segmenters to recover these non-VCL NAL units required for random access.

Accordingly, a new sample group may be used to indicate recovery points for random access when updates of some parameter sets have to be present before decoding. In VVC for example, some APS may be needed, even on samples corresponding to IRAP pictures. To identify this sample group, a new grouping_type may be defined, for APS recovery, for example 'apsr' (being noted that the name and four-character code here is just an example and may be more generic that dedicated to APS only, for example 'xpsr' for any parameter set recovery).

A VVC track may contain an 'apsr' (or 'xpsr') SampleToGroupBox and its associated SampleGroupDescriptionBox that contains entries of type APSRollRecoveryEntry (or XPSRollRecoveryEntry) inheriting from VisualSampleGroupEntry. These sample group entries are also identified with the 'apsr' code (or 'xpsr'). Compared with the 'roll' sample group, the 'apsr' sample group further provides a pre-processing instruction for parsers before outputting a bit-stream to a video decoder. This pre-processing may comprise gathering all APS prefix and suffix defined in a given past period. The following pre-processing indications may be indicated by the encapsulation module:
  fetch all APS from every preceding samples in a given "roll" count,
  fetch all APS from every sync samples in a given "roll" count,
  fetch all APS from the first sample of the track or track fragment,
  fetch all APS from the first sample of the containing ISOBMFF segment.

The 'apsr' (or 'xpsr') sample group indicates that a VVC sync sample from a VVC track requires additional gathering of prefix and suffix APS NAL units from preceding samples and rewriting possible suffix APS NAL units as prefix APS NAL units to be a self-contained sync sample. This avoids having to duplicate APS information at each sync sample in the track (then saving tens of kbits per second).

A sync sample not belonging to an 'apsr' sample group does not require any additional processing to gather the dependent APS (i.e., all required APS NAL units may be present in the sample entry or in the sample itself).

The 'apsr' sample group may be present in a VVC track or a VVC base track when they do not have any dependency to a non-VCL VVC track. The 'apsr' sample group may be present in a VVC subpicture track if this VVC subpicture track is indicated as playable track or indicated as a regular VVC track (e.g. sample entry of type vvc1 or vvi1). Having an 'apsr' sample group in non-VCL VVC tracks may be less useful because samples from non-VCL tracks may be obtained by players, for example during streaming only when needed, (e.g at startup or when seeking), and not systematically (e.g. during normal playout). A sample associated with an 'apsr' sample group description entry shall be a sync sample or a partial sync sample with SAP type 3 or 4 (potentially associated to a 'roll' sample group description entry) or with a SAP type defined for partial sync sample indication (e.g. type 7 or any value not conflicting with existing SAP type values).

Its syntax may be defined as follows:

```
aligned(8) class APSRollRecoveryEntry ( ) extends VisualSampleGroupEntry('apsr')
{
  unsigned int(2) roll_type;
  unsigned int(2) roll_mode;
  unsigned int(4) reserved=0;
  if(roll_type == 0) {
    unsigned int(16) aps_roll_count;
}}
``` with the following semantics:
  roll_type indicates the pre-roll distance for APS NAL when producing a sync sample with sample number N belonging to this group. The following values may be defined:
    0: APS NAL units are gathered starting from the sample located aps_roll_count samples before the sample belonging to the group,
    1: APS NAL units are gathered starting from the first sample of the track or track fragment,
    2: APS NAL units are gathered starting from the first sample of the associated ISOBMFF segment are gathered,
    3: reserved
  roll_mode indicates which samples in the identified roll sample window should be analyzed for APS NAL unit gathering. The following values may be defined:
    0: the required APS NAL unit may be present in any sample,
    1: the required APS NAL unit are only present in the first sample,
    2: the required APS NAL unit are only present in samples that are either sync samples or samples marked as 'rap',
    3: the required APS NAL unit are only present in samples of the current track fragment It is noted that the roll_mode here offers a great flexibility for the recovery process. The choice may be reduced, thus requiring less bits and values for a signalling of pre-roll distance. A variant may be to only indicate whether APS NAL units should be recovered from previous sync samples or in any kind of previous samples, thus encoding the roll_mode on a single bit.

aps_roll_count is optional and, when present, indicates the number of samples to rewind for APS (or xPS) gathering. Value 0 may indicate that the associated sample contains all APS NAL units for its processing. aps_roll_count should be such that all samples described by the roll operation are available in the track, track fragment, or ISOBMFF segment being processed, depending on the indicated roll_type. A sample associated with an 'apsr' sample group description entry must be a sync sample or a sample with SAP type 3 or 4 (potentially associated to a 'roll' sample group description entry). The SAP type of this sample will depend on roll_distance. A sample associated with an 'apsr' sample group description entry with aps_roll_count not equal to 0 must be considered as a SAP type 4. A sample associate with an 'apsr' sample group description entry with aps_roll_count equal to 0 may be declared as a sample with SAP type equal to 3. The values of roll_type and roll_count may be set and determined by the encapsulation module when performing the NAL unit analysis (for example in step 425 in FIG. 4 or in steps 305 in FIG. 3) and when appending or not the buffered NAL units in some sync samples (for example in steps 320, 450, or 474 in FIG. 3 or 4). Indicating the APS or xPS recovery may be combined with the indication of duplicated non-VCL NAL units required for random access. For example, when a segment or a fragment provides in its first sample all the required non-VCL NAL units, it may be used as a reference from where to recover APS or xPS and also be signaled as containing additional non-VCL NAL units.

Using Recovery at Sub-Sample Level

When considering VVC tracks with mixed_nalu_type, as described with reference to FIGS. 8a and 8b, the encapsulation module may decide to provide or to indicate how to recover NAL units required for random access on a subpicture basis and not necessarily on a sample basis.

Considering the case of two subpictures denoted SP1 and SP2 in a single VVC track like track 800, SP1 being IRAP every N frames, SP2 being also an IRAP every N frames but with an offset of k frames, with k belonging to [1, N[, the 'roll' info is signalled as positive roll of k.

It is to be noted that subpictures are considered here, the same may apply when storing multiple independent layers (with no subpictures) as one track and trying to decode all layers.

When doing random access in the stream, the roll (or recovery) process copies the VCL NAL units of SP2 between SP1 sync point (810-1) and before SP2 sync point (815-4) to the processing pipeline even though they are not needed. This increases the system memory usage and potentially the decoder processing time. There could even be cases where this leads to artefacts if the decoder tries to decode VCL NAL units from SP2 in case the decoder is not reset or is not informed that a random access is in progress.

The current 'roll' signalling for mixed NAL unit types non-aligned random access is not an optimal solution because it does not indicate which NALUs can be discarded during the roll period. A solution at NAL unit level, rather than sample level is required.

According to particular embodiments the NAL units are mapped to a groupID value whose semantics is defined by the sample group entry type associated with the grouping_type_parameter of the 'nalm' sample to group box (e.g. 'sbgp' box). The sample group is independent from NALU sizes, and appropriate to describe samples with constant NAL unit layout as is the case for VVC (with pps_rect_slice_flag=1) where the number of slices per picture unit is constant within a coded video sequence, at least for a given Picture Parameter Set To allow indicating a recovery process for random access at NAL unit level, the semantics of the groupID for 'roll' sample group when used in VVC tracks may be defined as follows: "A 'roll' sample group description can be used together with a NALU map sample group to describe the different roll distances of NAL units within a sample. This may be done by setting the grouping_type_parameter of the nalm SampleToGroupBox equal to 'roll'. The groupID defined by the NALU map sample group description entry identifies the 1-based index of the sample group description entry of type 'roll' for that track. If groupID is not assigned or groupID has a value 0, this indicates that the associated NAL units have a roll distance of 0 and shall not be discarded during the roll operation. Otherwise, the roll distance of the mapped NAL units is the roll distance indicated in the 'roll' sample group description entry."

However, ISO/IEC 14496-15, Section 10.2 states that "A track shall not contain both a SampleToGroupBox of type 'nalm' associated with grouping_type_parameter equal to a particular value groupType and SampleToGroupBox of type groupType." When using NAL unit mapping with 'roll' sample grouping, this might be problematic, as the start (or end) sample of the roll period needs to be marked as belonging to roll sample group of longest distance.

Therefore, ISO/IEC 14496-15, Section 10.2 should be amended, for example as follows: "Usually, a track does not contain both a SampleToGroupBox of type 'nalm' associated with grouping_type_parameter equal to a particular value groupType and a SampleToGroupBox of type group Type. If it contains both, the information given by the SampleToGroupBox of type groupType shall be valid for each NAL unit mapped, and the 'nalm' mapping provides finer grain information."

An example of finer grain information is information at NAL unit level rather than at sample level.

Allowing this use of sample group would allow mapping NAL units to the existing 'roll' sample group. For sample group not allowing this use, the NAL units may be rather mapped on an 'apsr' sample group.

In order to describe track 800 in FIG. 8a, a SampleTo-GroupBox with grouping_type='nalm' may map each sample to a NALU pattern with a given pair of roll_distances (or refresh period). For example, sample 805-1 (N) may be mapped into nalm[0], sample 805-2 (N+1) may be mapped into nalm[1], and so on until mapping sample 805-4 (N+3) into nalm[N+3].

With a roll_distance equal to 4 for the subpicture and a roll_distance equal to 3 for the second subpicture, the sbgp of type 'nalm' would then define 4 groups, each mapped into a different nal unit pattern in a NALU Map Entry such as:
Pattern 1:
 SP1 is an IRAP NALU for SP1;
 SP2 is 3 samples before an IRAP NALU for SP2;
Pattern 2:
 SP1 is 1 sample after an IRAP NALU for SP1;
 SP2 is 2 samples before an IRAP NALU before SP2;
Pattern 3:
 SP1 is 2 sample after an IRAP NALU for SP1;
 SP2 is 1 sample before an IRAP NALU for SP2.
Pattern 4:
 SP1 is 3 samples after an IRAP NALU for SP1;
 SP2 is on an IRAP NALU for SP2.

Accordingly, a SampleGroupDescriptionBox with grouping_type='roll' describes 4 entries with the following values for the roll_distance: {0, 1, 2, 3} (16 bits for each entry). The SampleGroupDescriptionBox containing the NALUMapEntry entries would be:

```
{
  Entry_count = 4
  // NALUMApEntry for first pattern
  Entry_count =2; [
    NALU_start_number = 1; groupID = 1; // roll_distance = 0 for NALU from SP1
    NALU_start_number = 2; groupID = 4; // roll_distance = 3 for NALU from SP2
  ]
  // NALUMApEntry for second pattern
  Entry_count = 1; [
    NALU_start_number = 2; groupID = 3; // roll_distance = 3 for NALU from SP2
  ]
  // NALUMApEntry for third pattern
  Entry_count = 1; [
    NALU_start_number = 2; groupID = 2; // roll_distance = 2 for NALU from SP2
  ]
  // NALUMApEntry for fourth pattern
  Entry_count = 1; [
    NALU_start_number = 2; groupID = 1; // roll_distance = 0 for NALU from SP2
  ]
}
``` where the group ID indicates an entry in a SampleGroupDescriptionBox with grouping_type equal to 'roll' (or 'aspr').

Each entry in the sample group description box provides a roll distance (or an aps_roll_count) with the possible values {0, 1, 2, 3}. For example, the entry (1) indicates that the NAL units for the first subpicture correspond to a sync sample (because groupID[1] indicates a roll_distance=0). It also indicates that the second range of NAL units, corresponding to the subpicture 2, map to the 4th entry and groupID[4] indicates a roll_distance of 3 samples. As another example, the line (2) indicates that the NAL units for the subpicture 2 map to the roll groupID 3 indicating a roll_distance of 2 samples. It is observed that NAL units of the first subpicture are not mapped because they are required for the decoding and the completion of the roll process. The indication that NAL units correspond to SP1 or SP2 is given in the start number field of the NAL unit mapped to the 'roll' sample group description.

In a variant, if the value of roll_distance is set to 0 for any non-mapped NAL units to save some space, it is only needed to map NAL units from the second subpicture SP2. The fourth pattern (pattern 4) does not need to be coded anymore. The SampleGroupDescriptionBox with grouping_type='roll' now describes 3 entries with the following values for the roll_distance: {1, 2, 3} (16 bits for each entry).

Therefore, the SampleGroupDescriptionBox containing the NALUMApEntry entries becomes (more compact):

```
{
  Entry_count = 3
  // NALUMApEntry for first pattern
  {entry_count=1, NALU_start_number = 2, groupID=3 } // roll_distance = 3 for SP2
  // NALUMApEntry for second pattern
  {entry_count=1, NALU_start_number = 2, groupID=2 } // roll_distance = 2 for SP2
  // NALUMApEntry for third pattern
  {entry_count=1, NALU_start_number = 2, groupID=1 } // roll_distance = 1 for SP2
    // no more fourth pattern to be mapped
}
```

The SampleToGroup(nalm) maps sample(N) to nalm[1], sample(N+1) to nalm[2], sample(N+2) to nalm[3], and does not map sample(N+3), implying groupID=0 so roll_distance=0.

It is to be noted that to avoid conflicts on use in a same media file or a 'roll' sample group and another 'roll' sample group used in a NALU mapping, the roll sample group to be used in a NALU mapping may, with the same semantics as described in this embodiment, use another four character code, different than 'roll' (and not conflicting with any other four character coded already in use).

It is also to be noted that the use of recovery or roll at subsample level may be combined with the 'apsr' sample group or with indication that some additional non-VCL NAL units required for random access are present. This may happen for track configurations like on FIG. 8a or 8b.

NALUMapEntry and Virtual Sample Group

As one may note from the above embodiment, providing a roll_distance may be considered as not really important once the roll process is started. Moreover, the roll_distance is described for many NAL units, which adds byte overhead in the track description. The span of the roll process is given by the 'roll' sample group. The samples with partial random access (one subpicture is a random access point and other are not), also called partial sync samples, may be marked with SAP type 4 corresponding to gradual decoding refresh or may be marked with a new SAP type value corresponding to an indication of a partial sync sample. A parser or reader will process all samples in the span of the roll, starting from the first one. What should be signalled is then which NAL units are included in the roll process and which may be discarded or are not included in the process.

According to particular embodiments, this signalling is done by the encapsulation module by defining a virtual sample group dedicated to gradual decoding refresh information. While described in the example for subpicture, this mechanism may also apply to regular GDR or multiple independent layers encapsulated within a same track, the IDR samples from at least one layer being not aligned with IDR samples of at least another layer. The grouping_type for this sample group is equal to 'gdri' (or any 4cc reserved for this purpose and not conflicting with an existing one). The semantics for such virtual sample group is defined as follows: "A sample belonging to a 'roll' sample group may be further described using a NALUMapEntry with a grouping_type_parameter (in SampleToGroupBox) set to 'gdri'. The 'gdri' grouping type does not necessarily refer to a sample group description defined in the track or track fragment. In other words, there may be no entry in a SampleGroupDescriptionBox with a grouping type equal to 'gdri' or preferably no SampleGroupDescriptionBox and no SampleToGroupBox with this grouping type. More generally a "virtual" sample grouping with grouping_type equal to a_given_type does not mandate the presence of a SampleGroupDescriptionBox or of a SampleToGroupBox with a grouping_type equal to this "a_given_type". The authorized set of values is defined in the semantics of the grouping type and the groupID in a SampleToGroupBox or in a NALU map entry shall match this authorized set of values. The semantics of groupID for a grouping type 'gdri' is defined as follows:

a NAL unit with a groupID value of 0 or a NAL unit not mapped to a groupID is required when processing the roll period a NAL unit with a groupID value of 1 is not required when processing the roll period and may be discarded other values of groupID are reserved The roll processing is defined by decoding all samples needed for the recovery to be complete, as defined by VisualRollRecoveryEntry (the 'roll' sample group).

The given information is only needed when performing random access to a 'roll' sample. A sample mapped into a NALUMapEntry within an associated grouping_type_parameter equal to 'gdri' must either belong to a sample group description of type 'roll' or be located at less than roll_distance sample count from a sample belonging to a sample group description of type 'roll'. An advantage of this approach is to avoid too many entries in the 'roll' sample group description, keeping only the entries related to roll information. It therefore reduces the number of entries in the NALUMapEntry. Another advantage is that it does not conflict with the use of 'roll' sample group at sample level. Media files encapsulating virtual sample grouping may require a new brand since some old parsers may not accept a NALUMapEntry with an associated grouping_type_parameter indicating a sample group not physically present in the file. To preserve backward compatibility, the presence of an empty SampleGroupDescriptionBox with grouping type equal to the "virtual_grouping_type" may be used. This latter use may not require a specific new brand while more costly in terms of description bytes (the bytes for the 'sgpd' box structure).

According to this embodiment, the VVC track on FIG. 8a may be described as follows (to indicate recovery of partial sync samples). The SampleToGroup with grouping_type='nalm' maps each sample to NALU patterns, no more on a roll_distance (or refresh period) basis but rather on the usefulness of the corresponding NALU for the recovery process. In the example on FIG. 8b, the initial 4 patterns from option 1 become:

Pattern 1:
  SP1 is needed
  SP2 is discardable;
Pattern 2:
  SP1 is needed
  SP2 is discardable;
Pattern 3:
  SP1 is needed
  SP2 is discardable
Pattern 4:
  SP1 is needed
  SP2 is needed As it can be seen, the content of the three first patterns is identical. Moreover, the last pattern corresponds to the default value (e.g. NAL units are required). Therefore, only a single pattern needs to be indicated.

The SampleGroupDescriptionBox with grouping_type='nalm' then contains one NALUMapEntry, assuming constant layout of NAL units (subpictures in the example) during the recovery period:

```
{
Entry_count = 1
// NALUMApEntry for the single pattern
Entry_count = 1; [
NALU_start_number = 2; groupID = 1; // NALU from SP2 is discardable
]
}
```

The NAL units from SubPicture 1 do not need to be mapped as they are all gathered in the roll period.

It is to be noted that the use of recovery (or roll) with NALUMapEntry and virtual sample group 'gdri' may be combined with the 'apsr' sample group or with indication that some additional non-VCL NAL units required for random access are present. This may happen for track configurations like on FIG. 8a or 8b.

Multi-Track

For the multi-track case where no non-VCL track is present, a base track may have an 'apsr' sample group to indicate where the APS are in the base track. When a non-VCL track is present, the base track may reference (e.g. using track reference) directly the non-VCL track to indicate where APS NAL units can be found or may provide reconstruction instructions, for example using a sample group for reconstruction instructions (e.g. 'spor' sample group). Moreover, in multi-track encapsulation, when the APS are stored in a non VCL track, the 'apsr' is not needed by defining the following implicit rules for both encapsulation module and parser module:

a sample in the video track that is not a sync sample may or may not have a corresponding sample in the associated VVC non-VCL track having the same decoding time, for each sync sample in the video track, the associated VVC non-VCL sample is the sync sample in the associated VVC non-VCL track having the same decoding time; if no such sample exists, the associated sample is constructed by merging the content of all samples started from the previous sync sample in the associated VVC non-VCL track, potentially rewriting all APS suffix (resp. SEI suffix) NAL units as APS prefix (resp. SEI prefix) NAL units and removing duplicated NAL units.

This means that a parser processing such video track depending on a non-VCL track for APS NAL units has to roll back in the non-VCL track to the previous sync sample in this non-VCL track. The encapsulation makes available the non-VCL NAL units for random in sync samples. Optionally, the encapsulation module may indicate according to some above embodiments that these non-VCL NAL units copied for random access may be skipped in normal playout.

Dependent Random Access Points (DRAP) and Extended DRAP Samples

Some video codecs, e.g. HEVC or VVC, define DRAP (Dependent Random Access Point) pictures as pictures that only refer to the associated intra random access point (IRAP) picture for inter prediction, and when random accessing from a DRAP picture, as long as the associated IRAP picture is available, the DRAP picture and all subsequent pictures in both decoding and output order can be correctly decoded. The ISO Base Media File Format standard is considering the support for dependent random access point samples (DRAP) and for Extended DRAP samples (EDRAP). A dependent random access point (DRAP) sample is a sample after which all samples in decoding order can be correctly decoded if the closest initial sample preceding the DRAP sample is available for reference. An EDRAP sample is a sample after which all samples in decoding order can be correctly decoded if the closest initial sample preceding the EDRAP sample and one or more other identified EDRAP samples earlier in decoding order than the EDRAP sample are available for reference. DRAP and EDRAP samples may be signaled in ISO Base Media Files (or segments) with 'drap' and 'edrp' sample group, respectively.

Figure 12:
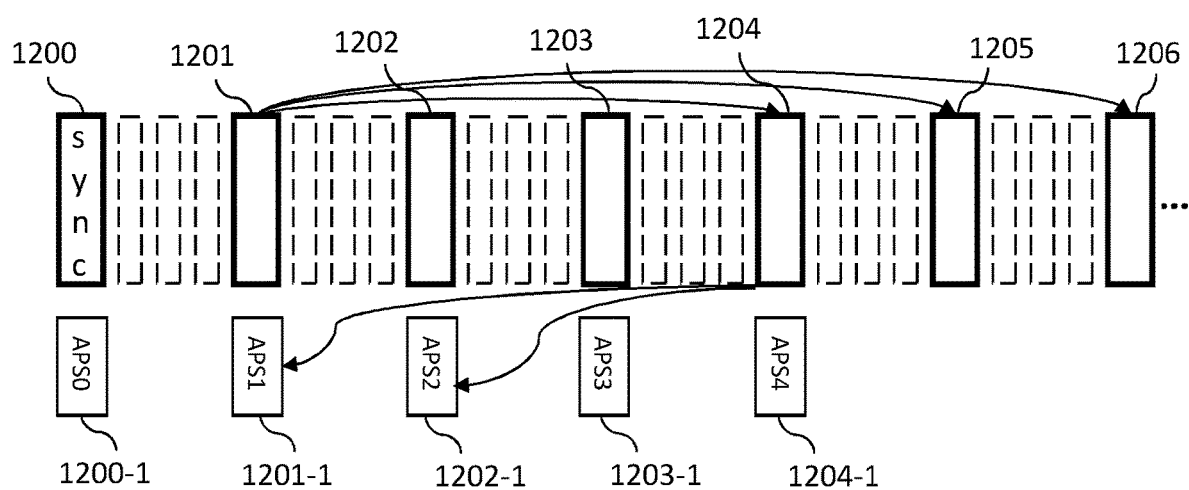
FIG. 12 illustrates an example of bit-stream with dependent random access samples.

For example, an HEVC or VVC video encoder (within encapsulation module 205 or within server 200) generates a bit-stream as illustrated in FIG. 12 that is composed of several pictures, each encapsulated as a sample (the terms picture and sample are equally used for description of FIG. 12). The initial sample 1200 is a sync sample (e.g. encapsulating an IDR picture or a CRA picture) and thus is not using any reference sample for inter prediction. The samples 1201, 1202, 1203, 1204, 1205, and 1206 use the initial sample 1200 as a reference sample. The video encoder is configured to produce a video bit-stream such that, the samples that follow (i.e. grey and white samples) the sample 1201, have no other reference sample that is prior to sample 1201. Similarly, the samples that follow (i.e. grey and white samples) the sample 1202, have no other reference sample that is prior to sample 1202; and the samples that follow (i.e. grey and white samples) the sample 1203, have no other reference sample that is prior to sample 1203. Thus, samples 1201 to 1203 are DRAP samples (and also EDRAP samples since a DRAP sample is also an EDRAP sample). The sample 1201 is a reference sample for the samples 1204, 1205 and 1206. The video encoder is configured to produce a bit-stream such that the samples following the sample 1204 are not referencing any samples in decoding order prior to sample 1204 except sample 1200. Similarly, the samples following the sample 1205 are not referencing any samples in decoding order prior to sample 1205 except sample 1200; and the samples following the sample 1206 are not referencing any samples in decoding order prior to sample 1206 except sample 1200. Thus, samples 1204, 1205 and 1206 are considered as EDRAP samples in the sample description of the encapsulated file (or segment).

As a result, a player can decode a stream starting at an EDRAP or at a DRAP sample with the constraint that it first decodes the one or more reference samples needed for correct decoding of the bit-stream starting from this EDRAP or DRAP sample. Thus, random access in a bit-stream can also be done at other samples than sync or partial sync samples provided that the player has indication to retrieve the preceding sync sample or preceding EDRAP or DRAP samples. This indication is the object of the 'drap' and 'edrp' sample groups.

As for sync and partial sync samples, a problem may arise when non-VCL NAL units of a previous picture unit are referenced by a DRAP or EDRAP. In particular, if these non-VCL NAL units are not present in the initial sample or the identified previous EDRAP samples, the encapsulated file needs to handle these dependencies. For example, with reference to the FIG. 12, the sample 1204 is an EDRAP sample that references the initial sample 1200 and the EDRAP sample 1201. Each reference 1200-1 to 1204-1 corresponds to non-VCL NAL units present in the sample 1200 to 1204, respectively, as illustrated in FIG. 12. In this example, the sample 1204 (and possibly following samples) may refer to an APS NAL unit 1202-1 that is not in one of the reference samples of the EDRAP, listed in the 'edrp' sample group. The ISOMBFF specification is not indicating if the DRAP or EDRAP samples require specific non-VCL units present in other sample(s) for their correct decoding.

In a particular embodiment, where a video bit-stream contains DRAP or EDRAP pictures, the reference to non-VCL NAL units made in DRAP and EDRAP samples and any following sample in decoding order are constrained. Typically, for each EDRAP sample in a VVC track, all APSs (or other non-VCL NAL units in a VVC track or HEVC track) needed for decoding of the corresponding video elementary stream from that decoding time forward are in the initial sample (the initial sample is a SAP sample of SAP type 1, 2 or 3 that is marked as such either by being a Sync sample or by the SAP sample group for example sample 1200 in FIG. 12) or in the zero or more other identified EDRAP samples in the EDRAP sample group or in the succeeding samples. This can be done by configuring the video encoder or when no such configuration is done on encoding, by copying during encapsulation, the non-VCL NALUs required for random access in one of the above listed samples. This additional constraint or the copy during encapsulation makes sure that non-VCL NAL units needed for decoding the bit-stream starting at the EDRAP or DRAP sample are present in the reconstructed bit-stream. In case of copy, the additional non-VCL NAL units for random access may be encapsulated
    within a metadata part of a file as described in corresponding embodiment and variants,
    within a data part of a file as described in corresponding embodiment and variants, or
    within both a metadata and a data part of a file.

In yet another embodiment, the signaling of the EDRAP sample group is modified to further indicate whether the reference samples of an EDRAP sample contain non-VCL NAL units that are required to decode the bit-stream from this EDRAP sample. The VisualEdrapEntry 'edrp' becomes the following (wherein bold syntax elements are new):

```
class VisualEdrapEntry( ) extends VisualSampleGroupEntry('edrp') {
    unsigned int(3) edrap_type;
    unsigned int(3) num_ref_rap_pics_minus1;
    unsigned int(26) reserved = 0;
    for(i=0; i<num_ref_rap_pics_minus1+1; i++)
        unsigned int(16) ref_RAP_sn_delta[ i ];
        unsigned int(1) ref_RAP_only_non_VCL_NAL_units;
        unsigned int(7) reserved = 0:
}
```

The semantics for ref_RAP_sn_delta[i] remains unchanged.

The new parameter ref_RAP_only_non_VCL_NAL_units[i] syntax element equal to 0 indicates that the reference sample with sample number equal to sample_number−(minus) ref_RAP_sn_delta[i] (sample_number is the sample number of the current sample in the EDRAP sample group) is a reference for inter prediction and may be a reference for non-VCL NAL units. When equal to 1, it indicates that the reference sample with sample number equal to sample_number−ref_RAP_sn_delta[i] is a reference for non-VCL NAL units only.

The (optional) reserved 7 bits is inferred equal to 0 and may be used for extension of the sample group. In practical these bits are used to align ref_RAP_sn_delta[i] on byte boundary.

As a result, a parser (or de-encapsulation module 215) reconstructing a bitstream starting at an EDRAP sample that references a RAP sample with ref_RAP_only_non_VCL_NAL_units[i] equal to 1 only needs to extract the non-VCL NAL units of this RAP sample and may discard the VCL NAL units. On the other hand, if ref_RAP_only_non_VCL_NAL_units[i] is equal to 0, the parser has to extract both VCL and the non-VCL NAL units of the referenced sample.

In a variant of this embodiment, the EDRAP sample group references in a first list the RAP samples that are required for decoding the EDRAP sample and further references, in a second list, samples that contain non-VCL NAL units required for decoding. When the EDRAP sample is present in both reference sample lists, this means that both non-VCL and VCL NAL units are required for decoding the samples starting at and following in decoding order the EDRAP sample. When the EDRAP is present only in the first list, only the VCL NAL units of the EDRAP sample are required for the decoding the samples starting at and following in decoding order the EDRAP sample. If this EDRAP sample contains non-VCL NAL units, they are skipped. If the EDRAP is present only in the second list, only the non-VCL NAL units of the EDRAP sample are required for the decoding the samples starting at and following in decoding order the EDRAP sample. The VCL NAL units of this EDRAP sample may be skipped.

In another variant, the second list of reference samples indicates the samples that contain only non-VCL NAL units needed for decoding the bit-stream starting at the EDRAP sample (i.e. their VCL NAL units are not required for the decoding of EDRAP and following samples in decoding order). In this variant, a sample cannot be present in both lists.

For instance, the sample group entry describing EDRAP samples is modified as follows:

```
class VisualEdrapEntry( ) extends VisualSampleGroupEntry('edrp') {
    unsigned int(3) edrap_type;
    unsigned int(3) num_ref_rap_pics_minus1;
    unsigned int(3) num_ref_non_vcl_pics_minus1;
    unsigned int(23) reserved = 0;
    for(i=0; i<num_ref_rap_pics_minus1+1; i++)
        unsigned int(16) ref_RAP_sn_delta[ i ];
    for(i=0; i<num_ref_non_vcl_pics_minus1+1; i++)
        unsigned int(16) ref_non_vcl_pics_sn_delta[ i ];
}
```

The num_ref_non_vcl_pics_minus1 syntax element plus 1 indicates the number of reference samples preceding the EDRAP sample in decoding order that contain non-VCL NAL units required for correct decoding of the EDRAP sample and all samples following the EDRAP sample in decoding order when starting decoding from the EDRAP sample.

The ref_non_vcl_pics_sn_delta[i] syntax element indicates a delta of the sample number of the i-th RAP sample that is preceding the EDRAP sample in decoding order and that contains non-VCL NAL units that are needed to correctly decode the EDRAP sample and all samples following the EDRAP sample in decoding order when starting decoding from the EDRAP sample. The variable RefNonVCL-RapSn[i], representing the sample number of the i-th RAP sample that contains these non-VCL NAL units, is derived as follows, where sample_number is the sample number of a current sample (i.e., a sample of the current EDRAP sample group): RefNonVCLRapSn [i]=sample_number−ref_non_vcl_pics_sn_delta [i].

In another variant, the sample group entry describing EDRAP samples includes a syntax element indicating a type of reference for each identified reference RAP sample. The reference type allows to determine the NAL units present in the RAP samples that are referenced by the EDRAP sample and following samples in decoding order. They are required to decode the bit-stream starting from the EDRAP sample. Each value of the reference type corresponds to a set of one or more NAL units. The following list is an example of sets of NAL units that may be associated with one reference type:
1. Parameter Sets NAL units
2. Sequence or Picture Parameter Sets NAL units
3. Prefix and Suffix APS NAL units
4. Prefix APS NAL units
5. Suffix APS NAL units
6. VCL NAL units
7. Non-VCL NAL units
8. All NAL units The sample group entry describing EDRAP samples is extended with a new syntax element for each reference RAP associated with the EDRAP sample.

```
class VisualEdrapEntry( ) extends VisualSampleGroupEntry('edrp') {
    unsigned int(3) edrap_type;
    unsigned int(3) num_ref_rap_pics_minus1;
    unsigned int(26) reserved = 0;
    for(i=0; i<num_ref_rap_pics_minus1+1; i++)
        unsigned int(16) ref_RAP_sn_delta[ i ];
```

-continued

```
        unsigned int(3) reference_type;
        unsigned int(5) reserved = 0:
}
```

The reference_type syntax element may be fixed length coded (for example with a length of 3 bits) and its value indicates the set of NAL units that are referenced by the EDRAP sample. For example, using the reference types in previous example, a file parser (de-encapsulation module 215) is able to determine that a RAP sample with a reference_type equal to 3 indicates that the parser has to extract only the APS NAL units for the reference sample. The (optional) reserved syntax element is inferred equal to 0 (for example with a length of 5 bits) and may be used for extension of the sample group. In practical these bits are used to align ref_RAP_sn_delta[i] on byte boundary.

Recovery Instructions for APS in Extended DRAP Samples

In another embodiment, the required non-VCL NAL units for correct decoding from a DRAP or EDRAP sample are indicated in an extension of the 'apsr' sample group from the previous embodiments called Using a sample group for recovery of APS required for random access. The 'apsr' sample group is then extended to apply not only to sync or partial sync samples but also to DRAP or EDRAP samples.

The extended 'apsr' sample group may be used when the 'edrp' sample group is present in the encapsulated file to provide the number of samples to roll over for the APS is. For example, the 'apsr' sample group is extended to DRAP or EDRAP samples by using the roll_type value 0 and relying on the aps_roll_count parameter given in the 'apsr' sample group with the same semantics as described in embodiment Using a sample group for recovery of APS required for random access. The aps_roll_count still indicates the number of samples to rewind for APS recovery (e.g. aps_roll_count=12 for EDRAP 1204 in FIG. 12 to recover the oldest APS 1201-1). In this embodiment there are two lists of reference samples: a first one in the 'edrp' sample group, a second one in the aps_roll_count parameter of the extended 'apsr' sample group. The former is used to recover all NAL units of a sample while the latter is dedicated to recover only the APS NAL units in the sample. The processing of both lists by a reader allows a correct decoding of the samples starting from an EDRAP sample. Therefore, the referenced samples in each list may differ. The parser may ignore the recovery process of the APS NAL units present in an 'apsr' sample group for the samples that are present in both lists. An alternative for this second variant consists in extending the 'apsr' sample group with a new roll_type value (e.g. 3) indicating_that the APS NAL units are gathered starting from the n previous sync sample or from the reference samples of the DRAP or EDRAP sample wherein the value for n is equal to the value of the aps_roll_count parameter. This requires to modify the 'apsr' so as to authorize presence of the aps_roll_count when roll_type equals 0 or equals 3. Optionally, an additional specific roll_mode value (e.g. 4 and encoding roll_mode on 3 bits, using one bit from reserved parameter or overloading the semantics for value 2) may indicate that the required APS NAL units are only present in samples that are either sync samples or samples marked as 'rap' or DRAP or EDRAP samples. Using this extended 'apsr' sample group avoids having to duplicate APS information at each sync or EDRAP sample in the track.

Advantageously, the writer may avoid signalling EDRAP dependencies in a 'edrp' sample group to retrieve only APS NAL units from the sample. Instead, the samples to use for the recovery of the APS NAL units are referenced in an 'apsr' sample group.

This encapsulation choice avoids readers to check duplication of APS.

Recovery Instructions for DRAP or Extended DRAP Samples at NAL Unit Level

A HEVC or VVC bitstream containing DRAP or extended DRAP pictures may be encapsulated with both a sample group indicating the reference samples for the DRAP or EDRAP samples (e.g. 'edrp' sample group) and a sample group providing recovery instructions for the NAL units required to decode the bitstream from a DRAP or EDRAP sample. This second sample group can be a sample group with grouping_type 'nalm' (mapping NAL units from group of samples to sample group entries) and grouping_type_parameter equal to 'edrp'. As indicated in the embodiment denoted Using recovery at sub-sample level, the 'nalm' sample group provides finer grain information for the 'edrp' sample group (i.e. dependencies at NAL unit levels rather than at whole sample level). These finer dependencies can help players to fetch and/or process only the minimum data from reference samples when starting decoding on a DRAP or EDRAP sample.

Figure 13:
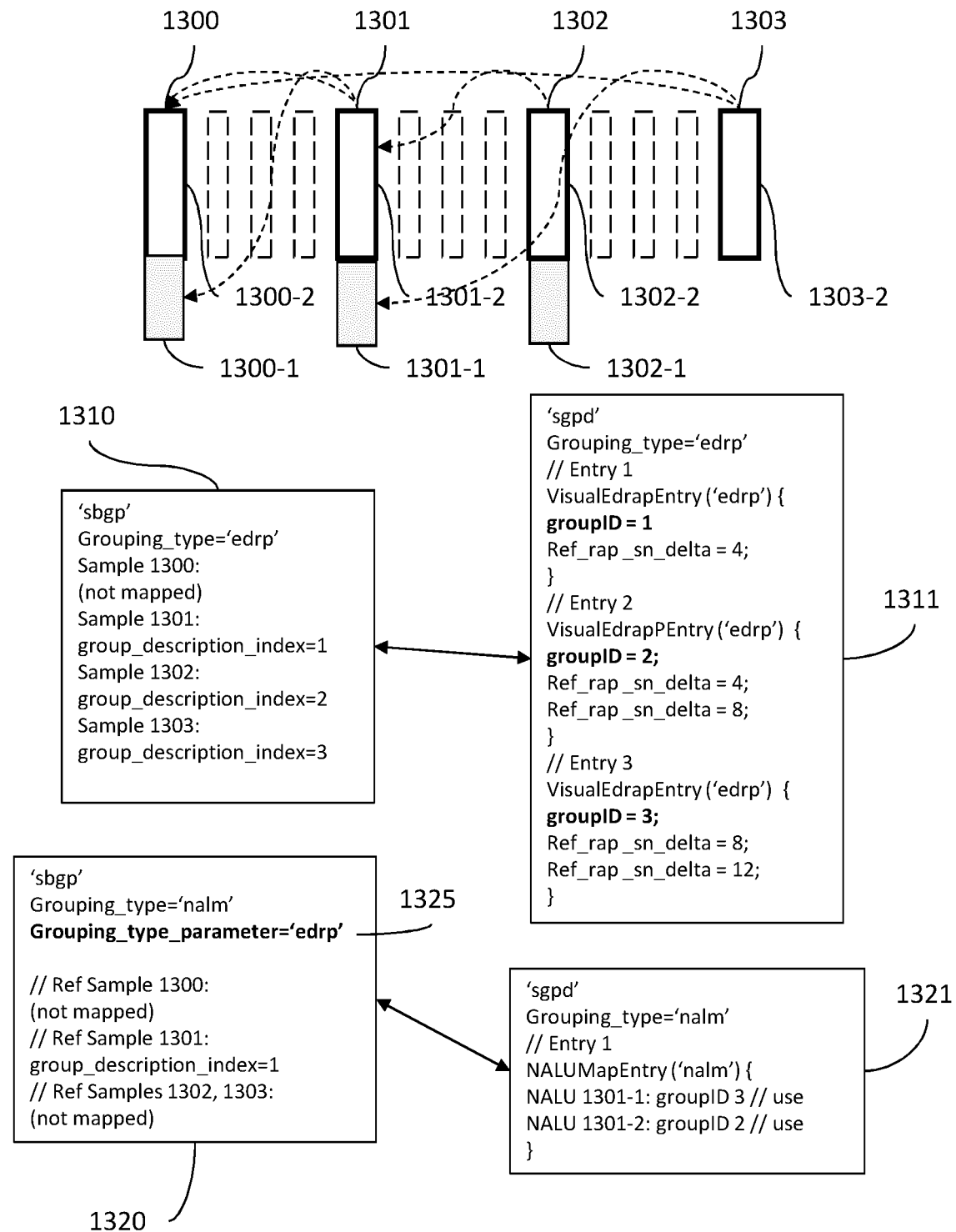
FIG. 13 illustrates an example of bit-stream with dependent random access samples and dependencies expressed at NAL unit level.

FIG. 13 illustrates a bitstream with DRAP or EDRAP samples and the dependencies described at NAL unit level.

A bitstream containing DRAP or EDRAP pictures (e.g. 1301, 1302, 1303), encapsulated as samples, is to be encapsulated by the encapsulation module 205. The DRAP or EDRAP samples (e.g. 1301, 1302, 1303), may depend on a sync sample (1300). The example of FIG. 13 considers zero or more non-VCL NAL units per sample (in gray, referenced 1300-1, 1301-1, 1302-1) and VCL NAL units (in white, referenced 1300-2, 1301-2, 1302-2 and 1303-2). The DRAP or EDRAP samples and their dependencies to previous DRAP or EDRAP samples are described by the 'edrp' sample grouping (SampleToGroupBox 1310 and SampleGroupDescriptionBox 1311). DRAP or EDRAP samples may have dependencies to previous samples. These dependencies are recorded by the encapsulation module as VisualEdrapEntry in the SampleGroupDescriptionBox 1311. In this embodiment, the VisualEdrapEntry are extended with a groupID parameter, i.e. an identifier allowing to reference a particular entry describing the dependencies for a DRAP or EDRAP sample. Dependencies may be either on non-VCL or on VCL NAL units or on both. For example, as dashed arrows illustrate, sample 1301 depends on both the non-VCL 1300-1 and VCL NAL 1300-2 units from sample 1300 and sample 1302 depends on VCL NAL units 1301-2 from sample 1301 while sample 1303 depends on non-VCL NAL units 1301-1 from sample 1301 and VCL NAL units 1300-2 from sample 1300. Samples referenced in the 'edrp' sample group description 1311 may be further described into a 'nalm' sample group (SampleToGroupBox 1320 and SampleToGroupDescriptionBox 1321 with grouping type equal to 'nalm'). The SampleToGroupBox 1320 has its grouping_type_parameter 1325 set to a four-character code, e.g. 'edrp', corresponding to the grouping type providing the list of sample dependencies for DRAP or EDRAP samples. This allows the NALU mapping described in box 1321 to further refine the dependencies for DRAP or EDRAP samples. The NALU Map entries in the SampleToGroupDescriptionBox 1321, may consist in a coarse NALU mapping, for example non-VCL versus VCL NAL units (as in 1321) or may provide a fine NAL unit mapping, up to one NAL unit at a time. The groupID value associated with a NAL unit or with a range of NAL units indicates an identifier of an entry in a SampleGroupDescriptionBox with grouping type equal to 'edrp' (value of the grouping_type_parameter 1325 in box 1320) describing the dependencies for a DRAP or EDRAP sample (e.g. a VisualEdrapEntry in the 'sgpd' box 1311 on the example of FIG. 13). For example, the referenced samples listed in the entries of the 'edrp' 1311 are grouped into group of samples in 1320. Their respective NAL units are then mapped (in 1321) to entries in 1311. For example, the reference sample 1301 has its NAL units mapped in the first entry of the box 1321 as follows: the non-VCL ones (1301-1) to the third entry of 1311 and the VCL ones (1301-2) to the second entry of 1311 (used by EDRAP sample 1302).

By parsing these four boxes, a reader can determine the minimum set of NAL units to fetch or process from an encapsulated media file. When a NAL unit or a range of NAL units in 1321 has groupID=0, it means that the corresponding NAL units are not used as reference by any DRAP or EDRAP picture in the bitstream. When a reference sample present in one entry of 1321 does not have its NAL unit mapped (i.e. sample not mapped in 1320), reader shall consider that all NAL units for this reference sample are required for correct decoding. This allows encapsulation module to only map samples for which only a subset of NAL units are required for correct decoding from a DRAP or EDRAP sample.

According to a particular aspect, the invention is also directed to a method for encapsulating a video bit-stream in a server, the method comprising:

obtaining at least one network abstraction layer unit (NAL unit) of a first subpicture of a random access picture, the random access picture having at least a first subpicture and a second subpicture, obtaining at least one NAL unit of a second subpicture of another picture having at least a first subpicture and a second subpicture, and encapsulating the at least one obtained NAL unit of the random access picture and an item of information directed to a location of the at least one obtained NAL unit of the other picture within the encapsulated video bit-stream, making it possible to generate a video bit-stream wherein the random access picture and pictures comprised between the random access picture and the other picture are partially decodable.

Still according to a particular aspect, the invention is also directed to a method for processing encoded pictures of an encapsulated video bit-stream in a client device, the method comprising obtaining an encapsulated bit-stream comprising at least one network abstraction layer unit (NAL unit) of a first subpicture of a random access picture comprising a first picture and a second subpicture, at least one NAL unit of a second subpicture of another picture comprising a first picture and a second subpicture, and an item of information directed to a location of the at least one NAL unit of the other picture within the encapsulated video bit-stream, making it possible to generate a video bit-stream wherein the random access picture and pictures comprised between the random access picture and the other picture are partially decodable. According to embodiment, only fully decoded pictures are displayed.

Although the present invention has been described herein above with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in claims not dependent upon each other does not indicate that a combination of these features cannot be advantageously used.

The invention claimed is:

1. A method for encapsulating a video bit-stream in an ISOBMFF track comprising samples, performed by a computing device, the method comprising:
   generating a specific data structure comprising a specific Sample ToGroupBox and an associated SampleGroupDescriptionBox for identifying a subset of data of at least one first sample, the identified subset of data being referenced by a second sample, the second sample being a random access sample following the at least one first sample, the second sample in the video bit-stream requiring at least the identified subset of data of the at least one first sample to be decoded and
   encapsulating the generated specific data structure, the at least one first sample, and the second sample,
   wherein the identified subset of data of the at least one first sample comprises a parameter set, and wherein the SampleGroupDescriptionBox contains an entry to reference the at least one first sample, the entry providing a pre-processing instruction to a parser for gathering the identified subset of data being referenced by the second sample.

2. A method for generating a video bit-stream from an ISOBMFF track comprising samples, performed by a computing device, the method comprising:
   receiving an instruction for generating a video bit-stream starting from a selected random access sample,
   obtaining at least a subset of data of the selected random access sample,
   obtaining a specific data structure, the obtained specific data structure comprising a specific Sample ToGroupBox and an associated SampleGroupDescriptionBox for identifying a subset of data of at least one first sample, the identified subset of data of the at least one first sample being referenced by the subset of data of the selected random access sample referred to as a second sample, the second sample following the at least one first sample, the second sample in the ISOBMFF track requiring at least the identified subset of data of the at least one first sample to be decoded,
   obtaining the identified subset of data of the at least one first sample, and generating a video bit-stream comprising the obtained subsets of data,
   wherein the identified subset of data of the at least one first sample comprises a parameter set, and wherein the SampleGroupDescriptionBox contains an entry to reference the at least one first sample, the entry providing a pre-processing instruction to a parser for gathering the identified subset of data being referenced by the second sample.

3. The method of claim 2, wherein the parameter set is a prefix and/or suffix adaptation parameter set (APS) and wherein the gathering comprises rewriting of suffix APS as prefix APS.

4. The method of claim 3, wherein the entry comprises a particular parameter indicating a set of samples from which at least one parameter set is required to decode the second sample, the samples of the indicated set of samples corresponding to the at least one first sample.

5. The method of claim 3, wherein the entry comprises a particular parameter indicating a sample within a set of samples, from which at least one parameter set is required to decode the second sample, the sample of the indicated set of samples corresponding to the at least one first sample.

6. The method of claim 3, wherein the entry comprises a number of samples composing a set of samples from which at least one parameter set is required to decode the second sample.

7. The method of claim 2, wherein the samples comprise network abstraction layer units (NAL units).

8. A non-transitory computer-readable storage medium storing instructions of a computer program for implementing each of the steps of the method according to claim 1.

9. A device for processing media data, the device comprising a processing unit configured for carrying out each of the steps of the method according to claim 1.

10. The method of claim 1, wherein the samples comprise network abstraction layer units, NAL units.

11. The method of claim 1, wherein the entry is of the APSRollRecoveryEntry type.

12. The method of claim 1, wherein the second sample is a sync sample, a dependent random access point sample (DRAP), or an extended DRAP sample (EDRAP).

13. The method of claim 1, wherein the entry comprises a particular parameter indicating a set of samples from which at least one parameter set is required to decode the second sample, the samples of the indicated set of samples corresponding to the at least one first sample.

14. The method of claim 1, wherein the entry comprises a particular parameter indicating a sample within a set of samples, from which at least one parameter set is required to decode the second sample, the sample of the indicated set of samples corresponding to the at least one first sample.

15. The method of claim 1, wherein the entry comprises a number of samples composing a set of samples from which at least one parameter set is required to decode the second sample.

16. The method of claim 2, wherein the specific data structure further comprises a NALUMapEntry, defined by ISO/IEC 14496-15 standards, referencing NAL units of the at least one first sample that are required to decode at least partially the second sample.

17. The method of claim 7, wherein the specific data structure further comprises a NALUMapEntry, defined by ISO/IEC 14496-15 standards, referencing NAL units of the at least one first sample that are required to decode at least partially the second sample.

18. A device for generating a video bit-stream, the device comprising a processing unit configured for carrying out each of the steps of the method according to claim 2.

19. A non-transitory computer-readable storage medium storing instructions of a computer program for implementing each of the steps of the method according to claim 2.

* * * * *